(12) United States Patent  
Ganesan et al.

(10) Patent No.: US 8,769,784 B2  
(45) Date of Patent: *Jul. 8, 2014

(54) SECURE AND EFFICIENT AUTHENTICATION USING PLUG-IN HARDWARE COMPATIBLE WITH DESKTOPS, LAPTOPS AND/OR SMART MOBILE COMMUNICATION DEVICES SUCH AS IPHONES

(75) Inventors: Ravi Ganesan, West Palm Beach, FL (US); Andrew Robert Rolfe, East Dundee, IL (US); Peter George Tapling, Park Ridge, IL (US)

(73) Assignee: Authentify, Inc., Chicago, IL (US)

( * ) Notice: Subject to any disclaimer, the term of this patent is extended or adjusted under 35 U.S.C. 154(b) by 245 days.

This patent is subject to a terminal disclaimer.

(21) Appl. No.: 13/332,912

(22) Filed: Dec. 21, 2011

(65) Prior Publication Data

US 2012/0124651 A1    May 17, 2012

Related U.S. Application Data

(63) Continuation-in-part of application No. 13/089,430, filed on Apr. 19, 2011, and a continuation-in-part of (Continued)

(51) Int. Cl.  
*G06F 21/00* (2013.01)
(52) U.S. Cl.  
USPC ..................................... 26/4; 726/5
(58) Field of Classification Search  
None  
See application file for complete search history.

(56) References Cited

U.S. PATENT DOCUMENTS

| 8,136,148 B1 | 3/2012 | Chayanam et al. |
| 2002/0095507 A1 | 7/2002 | Jerdonek |

(Continued)

FOREIGN PATENT DOCUMENTS

| JP | 11-338933 | 12/1999 |
| JP | 2002-259344 | 9/2002 |

(Continued)

OTHER PUBLICATIONS

International Search Report and Written Opinion, PCT/US2012/032840, Jun. 20, 2012.

(Continued)

*Primary Examiner* — Brandon Hoffman  
*Assistant Examiner* — Nega Woldemariam  
(74) *Attorney, Agent, or Firm* — Antonelli, Terry, Stout & Kraus, LLP.

(57) ABSTRACT

A portable apparatus is removably and communicatively connectable to a network device to communicate authentication or authorization credentials of a user in connection with the user logging into or entering into a transaction with a network site. The apparatus includes a communications port to connect and disconnect the apparatus to and from the network device and to establish a communication link with the network device when connected thereto. A processor receives a secure message from the network security server via the port. The message has a PIN for authenticating the user to the network site, and is readable only by the apparatus. The processor either transfers, via the port, the received PIN to an application associated with the network site that is executing on the network device or causes the apparatus to display the received PIN for manual transfer to the application associated with the network site.

17 Claims, 20 Drawing Sheets

Related U.S. Application Data application No. 13/081,150, filed on Apr. 6, 2011, and a continuation-in-part of application No. 13/081,067, filed on Apr. 6, 2011, and a continuation-in-part of application No. 13/011,739, filed on Jan. 21, 2011, and a continuation-in-part of application No. 13/011,587, filed on Jan. 21, 2011, and a continuation-in-part of application No. 12/938,161, filed on Nov. 2, 2010, now Pat. No. 8,458,774.

(60) Provisional application No. 61/533,820, filed on Sep. 13, 2011, provisional application No. 61/257,207, filed on Nov. 2, 2009, provisional application No. 61/298,551, filed on Jan. 27, 2010, provisional application No. 61/327,723, filed on Apr. 26, 2010, provisional application No. 61/334,776, filed on May 14, 2010.

(56) References Cited

U.S. PATENT DOCUMENTS

| | | |
|---|---|---|
| 2003/0028451 A1 | 2/2003 | Ananian |
| 2004/0030934 A1 | 2/2004 | Mizoguchi et al. |
| 2004/0210536 A1 | 10/2004 | Gudelj et al. |
| 2004/0225878 A1 | 11/2004 | Costa-Requena et al. |
| 2004/0242238 A1 | 12/2004 | Wang et al. |
| 2005/0135242 A1 | 6/2005 | Larsen et al. |
| 2005/0172229 A1 | 8/2005 | Reno et al. |
| 2005/0254653 A1 | 11/2005 | Potashnik et al. |
| 2006/0168259 A1 | 7/2006 | Spilotro |
| 2006/0168663 A1 | 7/2006 | Viljoen et al. |
| 2006/0235795 A1 | 10/2006 | Johnson et al. |
| 2007/0011724 A1 | 1/2007 | Gonzalez et al. |
| 2007/0067828 A1 | 3/2007 | Bychkov |
| 2007/0074276 A1 | 3/2007 | Harrison et al. |
| 2007/0079135 A1 | 4/2007 | Saito |
| 2007/0157304 A1 | 7/2007 | Logan et al. |
| 2007/0174904 A1 | 7/2007 | Park |
| 2007/0186095 A1 | 8/2007 | Ganesan et al. |
| 2007/0198437 A1 | 8/2007 | Eisner et al. |
| 2007/0279227 A1 | 12/2007 | Juels |
| 2007/0283273 A1 | 12/2007 | Woods |
| 2008/0028447 A1 | 1/2008 | O'Malley et al. |
| 2008/0034216 A1 | 2/2008 | Law |
| 2008/0052180 A1 | 2/2008 | Lawhorn |
| 2008/0109657 A1 | 5/2008 | Bejaj et al. |
| 2008/0120707 A1 | 5/2008 | Ramia |
| 2008/0172730 A1 | 7/2008 | Sandhu et al. |
| 2008/0254765 A1 | 10/2008 | Eliaz |
| 2009/0037983 A1 | 2/2009 | Chiruvolu et al. |
| 2009/0093300 A1 | 4/2009 | Lutnick et al. |
| 2009/0119754 A1 | 5/2009 | Schubert |
| 2009/0119776 A1 | 5/2009 | Palnitkar et al. |
| 2009/0132813 A1 | 5/2009 | Schibuk |
| 2009/0235339 A1 | 9/2009 | Mennes et al. |
| 2009/0249076 A1 | 10/2009 | Reed et al. |
| 2009/0249077 A1 | 10/2009 | Gargaro et al. |
| 2009/0254572 A1 | 10/2009 | Redlich et al. |
| 2009/0259588 A1 | 10/2009 | Lindsay |
| 2009/0259848 A1 | 10/2009 | Williams et al. |
| 2009/0265768 A1 | 10/2009 | Labaton |
| 2009/0288159 A1 | 11/2009 | Husemann et al. |
| 2009/0328168 A1 | 12/2009 | Lee |
| 2010/0017860 A1 | 1/2010 | Ishida |
| 2010/0024022 A1 | 1/2010 | Wells et al. |
| 2010/0041391 A1 | 2/2010 | Spivey et al. |
| 2010/0235897 A1 | 9/2010 | Mason et al. |
| 2010/0262834 A1 | 10/2010 | Freeman et al. |
| 2010/0268831 A1 | 10/2010 | Scott et al. |
| 2011/0072499 A1* | 3/2011 | Lin .................................. 726/6 |
| 2011/0153496 A1 | 6/2011 | Royyuru |
| 2011/0159848 A1* | 6/2011 | Pei et al. ........................ 455/411 |
| 2011/0161989 A1 | 6/2011 | Russo et al. |
| 2011/0208801 A1 | 8/2011 | Thorkelsson et al. |
| 2012/0005483 A1 | 1/2012 | Patvarczki et al. |
| 2012/0124651 A1 | 5/2012 | Ganesan et al. |

FOREIGN PATENT DOCUMENTS

| | | |
|---|---|---|
| JP | 2005-209083 | 8/2005 |
| WO | WO 2007107868 | 9/2007 |

OTHER PUBLICATIONS

Gralla, P. How the Internet Works, 2006, Que, pp. 346-347.

WOT *online). Against Intuition Inc., 2006 [retrieved on Aug. 24, 2012]. Retrieved from the *Internet: URL:web.archive.org/web/20061127233933/http://www.mywot.com/en/wot/help/wot_symbols_explained/, pp. 1-3.

PCT International Search Report and Written Opinion issued in International Application No. PCT/US 11/22482 on Jan. 26, 2011.

PCT International Search Report and Written Opinion issued in the International Application No. PCT/US2011/023525 on Apr. 5, 2011.

International Search Report/Written Opinion, PCT/US2011/022486, mailed Apr. 20, 2011.

International Search Report/Written Opinion, PCT/US2011/023528, mailed Apr. 27, 2011.

International Search Report/Written Opinion, PCT/US2011/032295, mailed Jun. 13, 2011.

International Search Report/Written Opinion, PCT/US2011/032271, mailed Jul. 11, 2011.

* cited by examiner

User Activity Log — 300

| Time (Pacific) | Browsing Activity Log |
|---|---|
| 2010-01-26 19:43:13 | Seal gave "fins up" to merchant.neatsvcs.com |
| 2010-01-26 19:43:22 | Seal gave "fins up" to merchant.neatsvcs.com and one time password provided |
| 2010-01-26 19:43:31 | Seal gave "fins up" to merchant.neatsvcs.com and one time password provided to sign transaction "Pay Alice $40" |
| 2010-01-26 19:43:42 | Seal gave "fins up" to merchant.neatsvcs.com |
| 2010-01-26 19:43:47 | Seal gave "fins up" to merchant.neatsvcs.com and one time password provided |
| 2010-01-26 19:43:57 | Seal gave "fins up" to merchant.neatsvcs.com and one time password provided to sign transaction "Pay Alice $40" |
| 2010-01-26 19:44:06 | Seal gave "fins up" to merchant.neatsvcs.com |
| 2010-01-26 19:44:10 | Seal gave "fins up" to merchant.neatsvcs.com |
| 2010-01-26 19:44:15 | Seal gave "fins up" to merchant.neatsvcs.com |

Figure 3

SECURE AND EFFICIENT AUTHENTICATION USING PLUG-IN HARDWARE COMPATIBLE WITH DESKTOPS, LAPTOPS AND/OR SMART MOBILE COMMUNICATION DEVICES SUCH AS IPHONES

RELATED APPLICATIONS

This application claims priority based on Provisional U.S. Application Ser. No. 61/533,820, filed Sep. 13, 2011 and entitled "Extending Device Based Authentify 2CHK Functionality". This application is also a continuation-in-part of pending application Ser. No. 12/938,161, filed Nov. 2, 2010 and entitled "A NEW METHOD FOR SECURE SITE AND USER AUTHENTICATION", which claims priority based on Provisional U.S. Application Ser. No. 61/257,207, filed Nov. 2, 2009. This application is also a continuation-in-part of pending application Ser. No. 13/011,587, filed Jan. 21, 2011, and entitled A NEW METHOD FOR SECURE USER AND TRANSACTION AUTHENTICATION AND RISK MANAGEMENT", which claims priority based on Provisional U.S. Application Ser. No. 61/298,551, filed Jan. 27, 2010. This application is also a continuation-in-part of application Ser. No. 13/011,739, filed Jan. 21, 2011, and entitled A NEW METHOD FOR SECURE USER AND TRANSACTION AUTHENTICATION AND RISK MANAGEMENT, which is a continuation-in-part of pending application Ser. No. 13/011,587. This application is also a continuation-in-part of pending application Ser. No. 13/081,067, filed Apr. 6, 2011 and entitled "SECURE AND EFFICIENT LOGIN AND TRANSACTION AUTHENTICATION USING IPHONES™ AND OTHER SMART MOBILE COMMUNICATION DEVICES", which claims priority based on Provisional U.S. Application Ser. No. 61/327,723, filed Apr. 26, 2010. This application is also a continuation-in-part of pending application Ser. No. 13/081,150, filed Apr. 6, 2011 and entitled "FLEXIBLE QUASI OUT OF BAND AUTHENTICATION ARCHITECTURE", which claims priority based on Provisional U.S. Application Ser. No. 61/334,776, filed May 14, 2010. This application is also a continuation-in-part of pending application Ser. No. 13/089,430, filed Apr. 19, 2011 and entitled "KEY MANAGEMENT USING QUASI OUT OF BAND AUTHENTICATION ARCHITECTURE". This application is also related to pending application Ser. No. 13/006,806, filed Jan. 14, 2011 and entitled "A NEW METHOD FOR SECURE USER AND SITE AUTHENTICATION", which is a continuation of pending application Ser. No. 12/938,161. The contents of the above identified applications are hereby incorporated herein in their entirety by reference.

TECHNICAL FIELD

This invention relates to security and privacy. More particularly it relates to web based login and transaction authentication, including web based signatures, using hardware plug-in devices compatible with desktop and/or laptop computers, and/or smart mobile communication devises, such as Apple iPhones™.

BACKGROUND OF THE INVENTION

User authentication using techniques such as passwords, one time passwords (OTPs), hardware or software smartcards, etc., have all proven to be either too weak and susceptible to man in the middle (MITM) or man in the browser (MITB) attacks, or else have proven too cumbersome and expensive. The use of single sign on techniques such as OpenID, FaceBook Connect, etc., only make the problem worse as once the attacker has compromised the master account they can now break into all other accounts that rely on that initial login. Further, the focus of attackers has shifted from trying to break the login process to using sophisticated techniques to come in after the act of login and to attack the transactions being performed. This has made transaction authentication, the act of confirming if the transaction seen at the back end web server is identical to that intended by the user, even more important.

Out of band authentication (OOBA), a technique by which a transaction is relayed to the user, and confirmation obtained, using an alternate form of communication, for instance by placing a voice phone call or a text message, is a promising alternative, but is also to inconvenient and costly to be used very often. It might be useful for the highest value transactions, or rare events like password resets, but using it for large numbers of transactions is too costly and cumbersome.

In our work, we developed innovations that address some of these problems. Specifically, we introduce the notion of the establishment of a security server that communicates with an independent pop-up window on the user's desktop that is being used to access the website. We determine how this security server can alert the user, via communications to the pop-up as to the legitimacy of the website the user is browsing via their browser. We also determine how this pop-up window can provide a user with a one time password to enable login into the website (i.e. authentication of the user to the website), based on a secret shared between the website and the security server. Of particular utility is the fact that it provide the security of one time passwords, but did not require a per user shared secret which all prior one time password systems have required. We refer to this using various terms, such as quasi out of band authentication (QOOBA), 2CHECK (2CHK) authentication, and Authentify authentication.

It is common when users browse an eCommerce website, such as a merchant, bank or broker website, for them to see Payment Buttons such as that provided by PayPal. When the user clicks on that payment functionality, the user is typically interacting directly with the payment provider. This means the user does not reveal their credentials, for authenticating to the payment provider, to the eCommerce site. This is an important feature that is no longer available when a user is interacting with the eCommerce site using a smart phone app the site provides.

Thus we extend that work to provide a separate secure client application which has an independent secure communication channel to a back end authentication server. This client application is sometimes referred to as the "QOOBA application" or the "QOOBAA" for short, "2CHK client", or the "Authentify Application" or "AA" for short. This client application can be used to show users transactions either to inform them of the transaction, allow the user to confirm/deny the transaction and/or provide the user with a transaction signature which he/she can use in another application, such as a merchant or bank website application. Further, the client application can also provide the user with an OTP, that can be used to login to different websites or other applications. We also develop two distinct methods of generating such OTPs. One in which the OTP is provided by the authentication server, and the other in which the client application is "seeded" during activation so it can then generate OTPs without any connection to the backend authentication server.

Additionally, we determine how this client application can be implemented as dedicated software on a computing device, or as a browser based application, or as an application on a mobile communications device, including a smart phone.

The profusion of smart phones has resulted in the coming to market of adjunct pieces of hardware that can attach to the smart phones using various interfaces. Much like one can attach a printer to a computer using a USB port and/or cable, one can also attach devices to smart phones using for instance the ubiquitous headphone jack.

The innovations described herein also further extend our work to provide for efficient and secure login authentication and transaction authorization using plug-in hardware compatible with smart mobile communication devices and Internet connectable personal computing devices.

OBJECTIVES OF THE INVENTION

The present invention is directed to providing improved login authentication and/or transaction authorization that is easily implemented on personal computing devices and smart mobile communication devices such as iPhones and iPads using adjunct hardware.

Additional objects, advantages, novel features of the present invention will become apparent to those skilled in the art from this disclosure, including the following detailed description, as well as by practice of the invention. While the invention is described below with reference to one or more preferred embodiments, it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

According to aspects of the present invention, a portable apparatus or hardware device, such as a smart card or iPhone plug-in device, etc., is removably and communicatively connectable to a network device, such as a smart phone or other smart mobile communication device, in order to communicate authentication credentials of a user in connection with either (i) the user logging into a network site, such as a merchant or bank website, or (ii) the user entering into a transaction, such as the purchase of a product or the movement of funds, with the network site. The apparatus includes a communications port, which can for example be a hard-wired port, such as a USB port or headphone plug jack, or a wireless port, such a Bluetooth port. The port is configured so as to be capable of connecting and disconnecting the apparatus to and from the network device and, when connected, establishing a communication link between the apparatus and the network device to which it is connected. Also included is a processor configured with the logic, e.g. software programming, to (1) receive, from a network security server via the port, a secure message that includes a personal identification number (PIN) for authenticating the user to the network site, and is readable only by the processor and not by the network device. The PIN is preferably an OTP. The processor is also configured to (i) transfer, via the port, the received PIN to an application associated with the network site and executing on the network device, such as a log-in web page or a transaction approval web page associated with the network site or (ii) cause the apparatus to display the received PIN to the user for manual transfer of the PIN to the application associated the network site. The display is typically, but not necessarily, on a display screen incorporated as part of the apparatus.

Preferably, the PIN corresponds to a secret shared only by the security server and the network site, and not by the user. The shared secret is also most preferably not associated with any particular user.

According to other preferred aspects of the invention, the apparatus may further include a data store. If so, the processor is preferably further configured to receive a request of the user to login to the security server, and to direct transmission from the port of the request and a user identifier, such as a home or cell phone number, to the security server via the network device. The processor is also configured to receive a user input including another PIN, which is also preferably and OTP, and to direct transmission from the port to the security server via the network device of the input other PIN. The port is further configured to receive from the security server via the network device, a session cookie and active session information indicating a period of time during which the session with the security server will remain active, in response to transmission of the other PIN. The data store is configured to store the session cookie so as to be accessible only to the processor.

According to still other aspects of the invention, the port may also or alternatively be configured to receive a seed from the security server via the network device. If so, the processor is preferably configured to direct storage of the received seed in a data store, which could, if desired, be the same data store as that referred to above. After the portable device is disconnected from the network device, the processor is configured to display the stored seed to the user at the apparatus for entry by the user into a seeding interface of a token and/or to enter the stored seed into a seeding interface of the token without user intervention. It should be understood that the received seed could be an intermediate seed for processing by the token to generate the final seed.

If the user is entering into a transaction with the network site, the processor is beneficially further configured to receive, from a network security server via the port, a secure message, readable only by the processor and not by the network device, including information associated with the transaction, typically transaction details. The processor can then cause the apparatus to display, for example on a screen that is included in the apparatus, the received transaction information to the user.

In an exemplary practical implementation, a first application executing on the network device, e.g. a smart phone, receives a request for authentication of the user in connection with either the user logging into a network site, e.g. a merchant or bank or broker website, or the user entering into a transaction, e.g. a purchase or movement of account funds, with the network site. A second application executing on a portable device, such as a smart card or other portable hardware capable of being connected to the network device, receives a secure message from a network security server via the network device to which it is connected, after receipt of the request for authentication by the first application. The secure message includes a PIN, which is readable only by the second application, for authenticating the user to the network site. That is, the PIN is not readable by the network device. The received PIN is transferred to the first application and the first application directs transmission of the transferred PIN from the network device to the network site to authenticate the user or authorize transaction to the network site.

The received PIN may be manually or automatically transferred to the first application. If manual, preferably the first application directs a presentation to the user by the network device of a web page associated with the network site that includes the request for authentication. The second application directs a presentation of the received PIN to the user by the portable device connected to the network device. The received PIN can then be manually transferred to the first application by the user inputting the PIN presented by the portable device into the web page presented by the network device.

The second application may, if desired, store the received PIN in a public data store, such as a pasteboard, within network device. If so, the received PIN can be transferred to the first application by the first application automatically retrieving the stored PIN from the public data store.

If so desired, authentication of the user to the security server can also or alternatively be performed. In such a case, the second application receives a request of the user to login to the security server and directs transmission of the request and a user identifier, e.g. a phone number, to the security server via the network device. A third application executing on the network device, such as a text message application, receives a message including another PIN, here again preferably a OTP, from the security server in response to the transmitted request. The third application directs a display by the network device of the other PIN to the user. The second application next receives a user input including the displayed other PIN and directs transmission of the input other PIN to the security server via the network device. In response to transmission of the other PIN, the second application receives a session cookie and active session information from the security server via the network device. As discussed above, the active session information indicates a period of time during which the session between the second application and the security server will remain active. The second application stores the session cookie in a private data store on the portable device that is accessible only to the second application. On the other hand, it stores the active session information in a public data store accessible to the first application.

If certain seeding functionality is provided, the second application receives a seed from the network security server via the network device. The received seed is stored so that, after the portable device is disconnected from the network device, the seed is presentable to the user at the portable device for entry by the user into a seeding interface of a token on the portable device and/or enterable into the seeding interface of the token without user intervention.

If the received request for authentication is in connection with the user entering into a transaction with the network site, the second application may beneficially receive, from the network security server via the network device, information associated with the transaction and direct a presentation to the user of the transaction information by the portable device.

BRIEF DESCRIPTION OF DRAWINGS

FIG. 3 depicts a log of network activities that can be maintained and used for augmented risk intelligence analysis, in accordance with the initial extensions of our initial work.

PREFERRED EMBODIMENT(S) OF THE INVENTION

Our Initial Work Described in Parent Ser. No. 12/938,161 Application

In initial work we introduce a network based security server with an independent channel to a user pop-up that can be used in conjunction with a user's browser and the website being visited to provide both website and user authentication via a single user network device. As noted above, we sometimes refer to this as Quasi-Out-Of-Band Authentication (QOOBA) or 2CHECK (2CHK) authentication. It should be understood that the use of the term "we" should not be construed to imply multiple inventors participated in any particular invention described herein. Rather, the term is sometimes used to reflect that others may have been involved in routine programming and other none inventive work relating to the particular invention being described.

Figure 1:
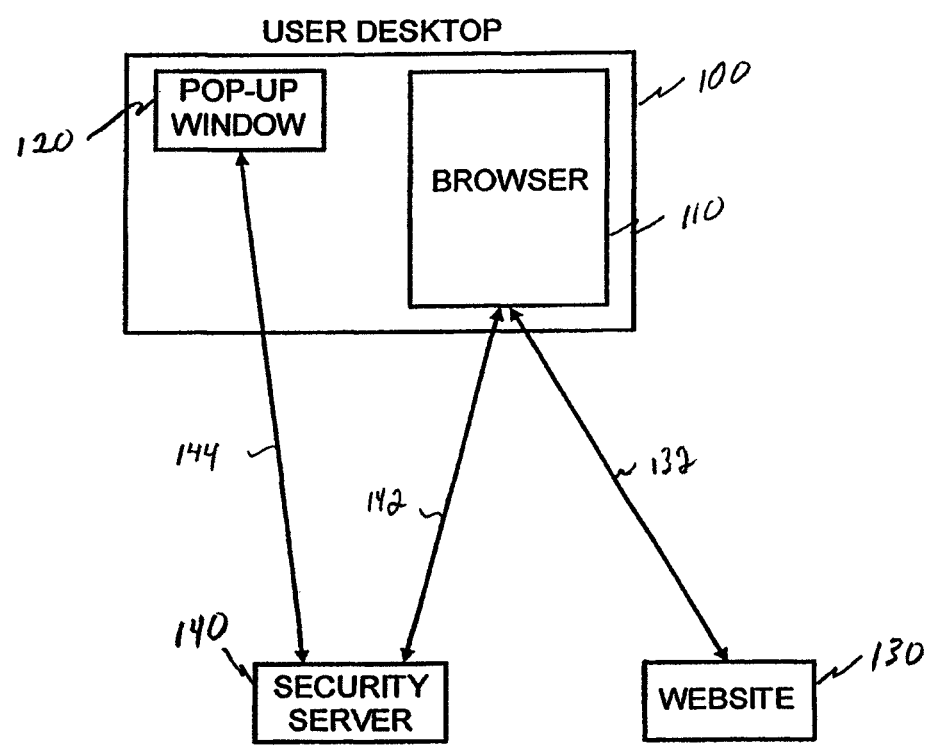
FIG. 1 depicts the main components of a system, in accordance with our initial work and initial extensions thereof.
Figure 2:
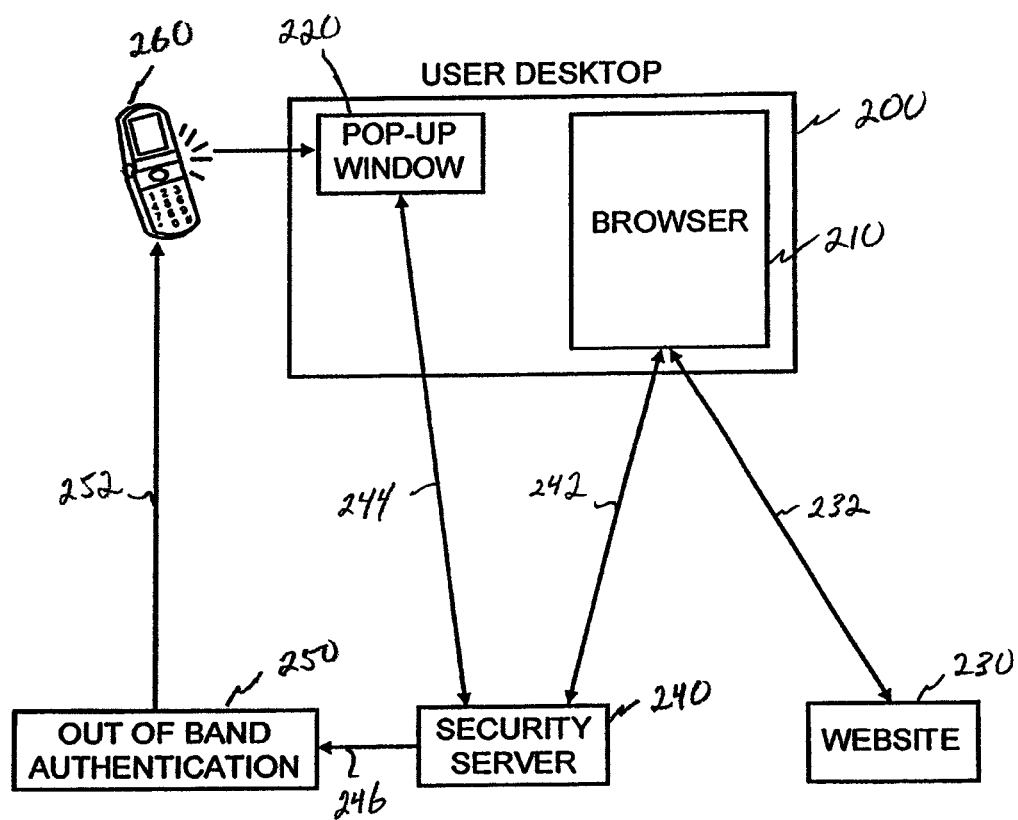
FIG. 2 shows the system of FIG. 1 augmented with user authentication, in this case achieved using out of band authentication, in accordance with our initial work and initial extensions thereof.

A preferred embodiment for an authentication system is shown in FIGS. 1 and 2. The system includes the following components:

A security server 140 or 240.
A pop-up window 120 or 220 on the user's desktop 100 or 200.
A browser on the user's desktop 110 or 210.
The website 130 or 230 at which the user is performing the transaction.

The user will first go through a set up and personalization phase which is a one-time process, and will then start up or activate the pop up 120 or 220 using a technique such as out-of-band authentication (OOBA). At this point the security server 140 or 240 will have an active communication channel 142 or 242 open to the user which it identifies by some user identifier, for instance the phone number used for OOBA. Further, the website 130 or 230 at which the user is visiting and the security server 140 or 240 would have previously agreed on a shared secret.

The user, using the browser, inputs a request to access to certain information that is transmitted by the browser 110 or 210 to the web server 130 or 230 via communication channel 132 or 232. The web server 130 or 230 transmits this request to the security server 140 or 240 via the user's browser 110 or 210 via communication channels 132 and 142 or 232 and 242, as applicable. The security server 140 or 240 computes a one time login personal identification number (PIN), i.e. a one-time-password (OTP), to authenticate the user to the website, as a function of the secret it shares with that particular website 130 or 230. The security server 140 or 240 then transmits this one time login password to the user's pop-up window 120 or 220 via communication channel 144 or 244. The user cuts and pastes or otherwise copies this one time login password into the web browser 110 or 210 and the login password is transmitted back to the website 130 or 230 via communication channel 132 or 232. The website 130 or 230 independently computes the login password using the secret it shares with the security server 140 or 240, and compares it with the one received from the user. If the two match then the web server 130 or 230 can be assured that the security server 140 or 240 is authenticating the same user that has requested access (i.e. not someone else pretending to be the user who has intercepted the request en route to the security server), and since the security server 140 or 240 is showing the user login password in an independent channel 144 or 244, user confirmation of the request is obtained.

Extensions to Transaction Signatures, Utilizing Different Form Factors and Maintaining User Event Logs Described in Parent Ser. No. 13/011,587 Application We extend this concept, i. e. QOOBA, to transaction authorization. Specifically, when a website receives a transaction from a user browser, which it wishes to confirm, it sends the transaction information to the security server, which forwards the transaction information to the user pop-up, which we sometimes refer to as the QOOBA Window, along with a one time transaction signature which is computed based on a secret shared between the security server and the website server and on the transaction information. We sometimes refer to such as signature as a personal identification number (PIN) or a one time password (OTP). As noted above, the shared secret is not associated with any particular user. That is, there is no requirement for a per user shared secret. The user transfers this one time transaction signature to the web server via the browser, and the web server can recalculate the one time transaction signature, and if there is a match, can be assured that the user has confirmed the transaction.

We also extend the concept of a browser-based pop up to different form factors. For instance the pop-up can be implemented as a smart phone app, as a dedicated part of a smart phone screen that is used only for this purpose, or it could be implemented as a smartcard.

We additionally take advantage of the fact that the pop-up (or its substitute) has a log of every user login and transaction. Traditionally, risk engines watch user activity at a given website to determine suspicious behavior. Or in some cases networks of websites share such information. In other words data from the back-end systems is analyzed. In our system the pop-up's log of a user's login and transaction history provides a user centric front end way to capture this information and augment the capabilities of the risk engines.

In this initial extension of the above to network transactions, and referring again to FIGS. 1 and 2, the user using the browser selects a transaction, e.g. "Pay Alice $100", which is transmitted by the browser 110 or 210 to the web server 130 or 230 via communication channel 132 or 232. The web server 130 or 230 transmits this transaction to the security server 140 or 240 via the user's browser 110 or 210 over communication channels 132 and 142 or 232 and 242, as applicable. The security server 140 or 240 computes a one time transaction signature, i.e. an OTP, as a function of (i) the transaction details and (ii) the secret it shares with that particular website 130 or 230. The security server 140 or 240 then transmits this one time transaction signature to the user's pop-up window 120 or 220 via communication channel 144 or 244. The user cuts and pastes or otherwise copies this one time transaction signature into the web browser 110 or 210 and the signature is transmitted back to the website 130 or 230 via communication channel 132 or 232. The website 130 or 230 independently computes the transaction signature using the (i) the transaction details and (ii) the secret it shares with the security server 140 or 240, and compares it with the one received from the user. If the two signature's match then the web server 130 or 230 can be assured that the security server 140 or 240 saw the same transaction it sent (i.e. not a transaction manipulated en route to the security server), and since the security server 140 or 240 is showing the user the transaction in an independent channel 144 or 244, user confirmation of the transaction is obtained.

In summary, the binding between the user, the security server 140 or 240 acting as an identity provider and the website 130 or 230 which is the relying party in the case of transactions made over a network, such as the purchase of a product by a user at the website, is significantly strengthened.

The security server 140 or 240 and the website 130 or 230 have a priori agreed on a shared secret (the system is easily extended to use public key cryptography). Additionally, as shown in FIG. 2, the user has used some method, for instance the security server 240 communicating with OOBA server 250 via communication channel 246, and OOBA server 250 communicating with the user's cell phone 260 via OOBA communication channel 252, to authenticate the user to the security server 240. Such authentication of the user to the security server 240 is of course performed prior to the security server 240 providing the user, via the pop-up window 220, with the credentials required for authenticating to website 230, e.g. for login purposes, or for confirming a transaction with the website 230.

Thus, when the user wishes to enter into a transaction at a website 130 or 230, such as the purchase of a product offered at the website or the transfer of funds from a bank account, the website 130 or 230 communicated transaction details (such as the type and amount of the transaction), which were presented both on a web page displayed to the user via the user's browser 110 or 210 and on a pop-up window 120 or 220. Before proceeding with the transaction, the website 130 or 230 required authentication and confirmation of the transaction, or what is commonly referred to as a signature of the user on the transaction. Therefore, the web page additionally displayed a blank for entry of the user's signature. Furthermore, the website 130 or 230 also communicated a request for the user's signature on the identified transaction to the security server 140 or 240. The security server 140 or 240 calculated an OTP, for example the above described one time transaction signature, as a function of (i) the secret it shares with the website 120 or 230 and (ii) the applicable transaction details displayed in the pop-up window 120 or 220, and displayed the OTP to the user in the pop-up window 120 or 220. The user entered (perhaps by cutting and pasting) this OTP onto the web page, which served as the user's signature on the transaction. The OTP, i.e. the signature, was then transmitted to the website 130 or 230. The website 130 or 230 confirmed the authenticity of the signature by re-computing the OTP from the secret it shares with the security server 140 or 240 and the transaction details. Here again, this system has all the security properties of OTPs, yet has the tremendous advantage that it does not require a shared secret with each user, and it is only the security server 140 or 240 and the websites, such as website 130 or 240, that need shared secrets for the purpose of generating OTPs used as signatures on transactions. The actual OTP can, if desired, also be constructed based on a time stamp or a counter based OTP algorithm (in the way we use these algorithms, the time or counter value needs to be communicated by the security server 140 or 240 to the website 130 or 230) or potentially be computed deterministically using some agreed upon formula.

In either of the above referenced preferred embodiments shown in FIGS. 1 and 2, as a user performs multiple logins and transactions the pop-up or its substitute has the ability to store a history or log of these events, such as by storing a User Activity Log 300 as shown in FIG. 3. Such data can then be fed to risk management engines, which today only have access to patterns of user activity that they observe from one or more websites. More particularly, conventional risk analysis relies on data from websites. However, because of the flow of information in QOOBA, a log of data, such as one of the type shown as User Activity Log 300 in FIG. 3, to capture the user's activities while the pop-up window 120 or 220 is active, can be easily maintained. The log could, for example, be maintained by the security server website 140 or 240, and the user can access this log. If desired the user or the security server 140 or 240 can compute the user's risk profile. Additionally, or alternatively, the logged data can be forwarded to a third party risk engine (not shown), where it can be married with data received from websites visited by the user so that the risk engine can provide the user with an augmented risk intelligence analysis.

Furthermore, as noted above, the pop-up can be implemented in one of a variety of different form factors. One variety contemplates the pop-up window being on an application on a mobile device, another contemplates the window using a dedicated part of the display area of a personal mobile network device, such as a smart phone, and the last contemplates the pop-up window being embodied in dedicated hardware similar to that of a smartcard, which has communication capabilities. In all cases all functionality will work in exactly the same fashion, except that the user can no longer cut and paste the OTPs used for authentication or authorization, such as the one time login PIN or transaction signature described above, and would instead have to type them into the web browser operating on a different network device. These form factors provide additional layers of security simply by being independent of the user's desktop computer running the browser. For example, implementation on smart phone is easily accomplished because the phone is already personalized and, in accordance with the techniques described above, OTP generation relies on the use of a secret shared by only the website and security server and therefore the phone does not need to store a special secret or execute OTP software. Rather, only the website and the security server need share the necessary secret and only the security server need generate the OTPs required for user authentication and user signature.

Figure 4:
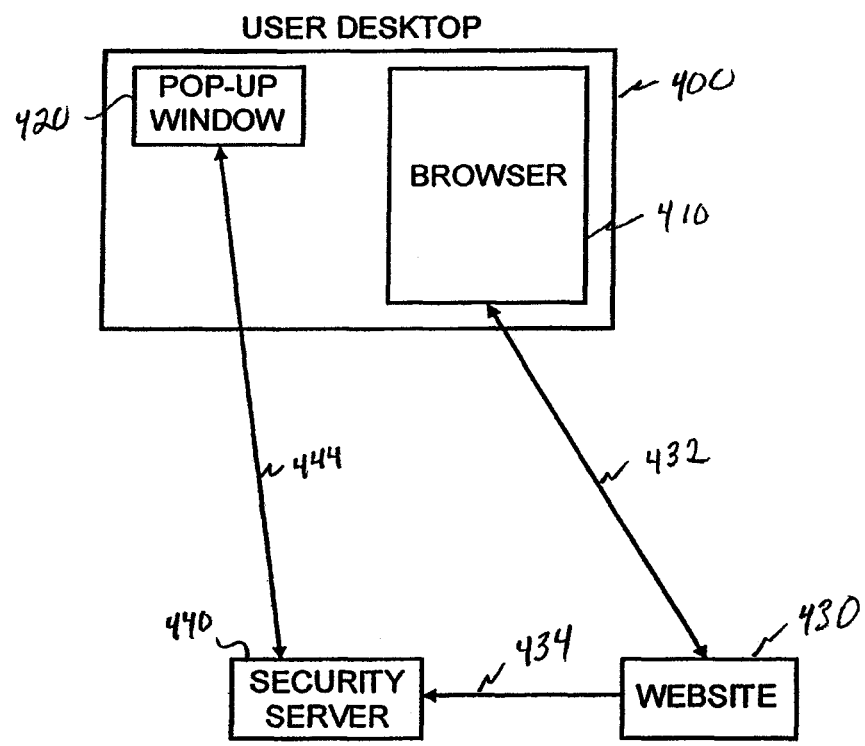
FIG. 4 depicts the main components of a system, in accordance with further extensions of our initial work.
Figure 5:
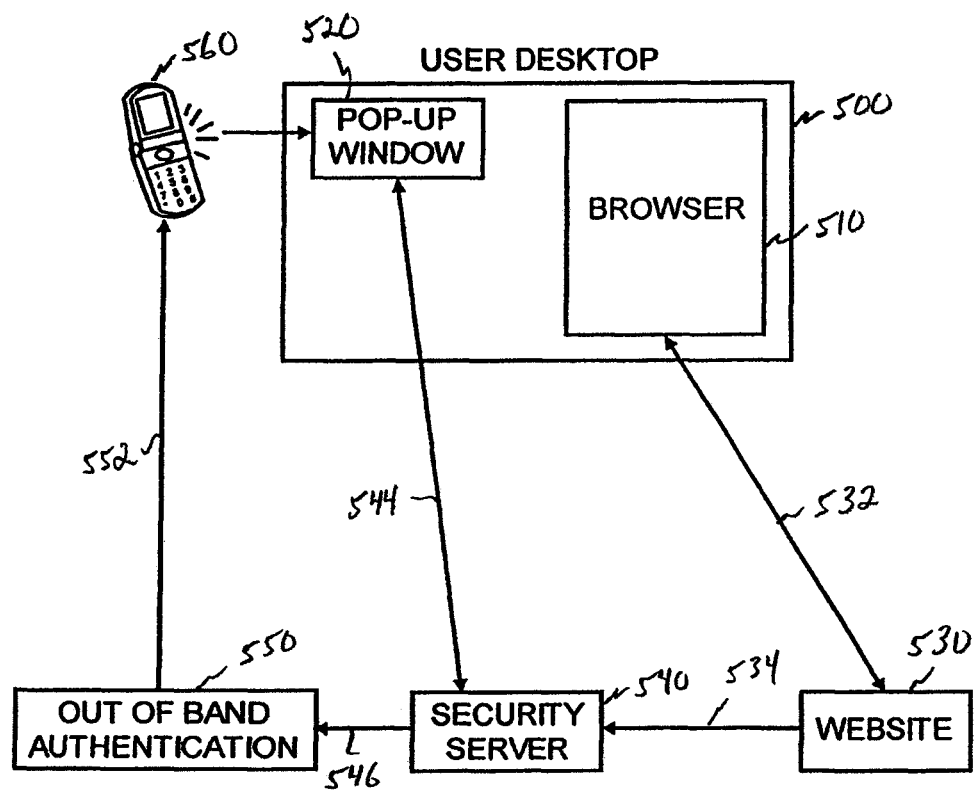
FIG. 5 shows the system of FIG. 4 augmented with user authentication, in this case achieved using out of band authentication, in accordance with the further extensions of our initial work.

Extensions to Utilize Direct Communications Between Websites and the Security Server Described in Parent Ser. No. 13/011,739 Application In a still further extension and referring now to FIGS. 4 and 5, another preferred embodiment allows for direct communications of authentication requests and transaction information between the website 430 or 530 and the security server 440 or 540 via communication channel 434 or 534. More particularly, as shown in FIGS. 4 and 5, the user first performs a set up and personalization phase which is a one-time process, and then starts up or activates the pop up 420 or 520 using a technique such as involving OOBA via OOBA server 550, the user's cell phone 560 and communication channels 546 and 552, as has been described above. At this point the security server 440 or 540 has an active communication channel or session 544 open to the user which it identified by some user identifier, for instance the phone number, e.g. the user's cell phone 560 number, used for OOBA. Further, the website 430 or 530 at which the user is transacting and the security server 440 or 540 have a previously agreed on shared secret.

The user uses browser 410 or 510 to select a transaction, e.g. "Pay Alice $100", which is transmitted by the user's browser 410 or 510 to the web server 430 or 530. The web server 430 or 530 transmits this transaction to the security server 440 or 540 via a direct link 434 or 534 that has been established between the website 430 or 530 and the security server 440 or 540 (rather than via the user's browser 410 or 510). The security server 440 or 540 computes a one time transaction signature as a function of (i) the transaction details and (ii) the secret it shares with that particular website 430 or 530. The security server 440 or 540 then transmits this one time transaction signature to the user's pop-up window 420 or 520. The user cuts and pastes or otherwise copies this one time transaction signature into the web browser 410 or 510 and the signature is transmitted back to the website 430 or 530. The website 430 or 530 independently computes the transaction signature using the (i) the transaction details and (ii) the secret it shares with the security server 440 or 540, and compares it with the one received from the user. If the two signature's match, then the web server 430 or 530 is assured that the security server 440 or 540 saw the same transaction it sent (i.e. not a transaction manipulated en route to the security server 440 or 540), and since the security server 440 or 540 showed the user the transaction in an independent channel or session 444 or 544, user confirmation of the transaction is obtained.

Extension to Smart Mobile Communication Devices Including Smart Phones as Described in Parent Ser. No. 13/081,067 Application As noted above, the pop-up can be implemented in one of a variety of different form factors. One variety contemplates the pop-up window being on an application on a mobile device, another contemplates the window using a dedicated part of the display area of a personal mobile network device, such as a smart phone, and the last contemplates the pop-up window being embodied in dedicated hardware similar to that of a smartcard, which has communication capabilities. In all cases all functionality will work in exactly the same fashion, except that the user can no longer cut and paste the OTPs, e.g. the one time login PINs and transaction signatures, used for authentication, and would instead have to type them into the web browser operating on a different network device. These form factors provide additional layers of security simply by being independent of the user's desktop computer running the browser.

In another extension of our work, an innovative Modified Quasi-Out-Of-Band Authentication (MQOOBA) protocol is used, in lieu of the QOOBA protocol which we have previously described, in implementations utilizing smart phones (SPs), such as iPhones™ and other sophisticated smart mobile communication devices. In accordance with this protocol, a MQOOBA Application, which is sometimes referred to the Hawk and Seal application and is referred to most often below as the Authentify™ Application (AA) or as the QOOBA application, eliminates the need for and hence replaces the pop-up window, or what is sometimes referred to as the QOOBA pop-up, described above. The AA can be used:
    To interact with other Smart Phone Applications (SPAs), such as on-line banking applications;
    To supply personal identification numbers (PINs) for web browsing via an authentication system; and/or
    As a basis for mobile phone payments via a payment system.

The AA can be used to provide a secure payment method in conjunction with other SPAs, and without the other SPAs learning the user credentials to the payment system. The AA is easily integrated into an on-line banking application. In the following example, the SP has the AA and a sample application for the eDuckies store. The AA and eDuckies Application (EDA) are assumed not to multi-task in this example. Each has private storage no one else can see. The AA also has public storage any other SPA can see.

The user opens the AA and logs in, perhaps once a day. For example, either the user can enter his/her phone number, e.g. the phone number for the SP, or the AA can auto-fill in this information depending on the user's preference. Behind the scenes the AA talks to, i.e. communicates with, the authentication server (also often referred to as a security server), which then issues a login PIN to the user via a short messaging service (SMS), which is now commonly referred to as a text messaging service.

The user receives the text message with the Login PIN and enters the received Login PIN into the AA. On some SP platforms, the AA can be configured, if so desired, to retrieve the PIN from the incoming SMS stream and auto fill the Login PIN in, making it even easier for users. A private equivalent of a session cookie is stored by the AA, and will be used by the AA for subsequent authentications to the authentication server to obtain transaction PINs, i.e. transaction signatures, when available. The AA also communicates with SPAs using the most appropriate method. A unique advantage of this invention is the ability to use public shared storage, such as public pasteboards on the operating system of iPhones. The user is now logged in and a MQOOBA session is active.

The user may now start using other SPAs and return to the AA when needed. In this example, the user now browses the EDA, and eventually wants to place an order. eDuckies would like to get authorization of this order seamlessly. However, it would be insecure to let the user provide payment credentials to the EDA.

Accordingly, the EDA post the transaction to the authentication server, which here serves as the payments system. The EDA also asks the user to authorize the transaction at the AA. This is similar to a user being redirected to a payments website, such as PayPal™, to authorize a transaction. The authentication server will post the transaction to the AA for presentation to the user.

Back at the AA, the user sees a transaction waiting, gets it, and sees that it looks legitimate. Accordingly, the user authorizes the transaction. It should be understood that MQOOBA makes it extremely difficult for an attacker, even one who somehow has placed a malicious eDuckies App on the user's phone, to be able to fake this. The MQOOBA PIN is generated based on a shared secret between authentication server and legitimate merchant site, in this case the eDuckies website, and transaction information, etc. if applicable.

After the user authorizes the transaction at the AA, back at the EDA the user sees the PIN auto-filled in for them. Behind the scenes, the PIN was generated (using the transaction information provided by the EDA and the secret shared by the authentication server and eDuckies website) by the authentication server, and transferred from the authentication server to the AA. The AA then transferred the PIN to the EDA on the user's SP using the shared storage. It should also be understood that, if desired, the user could be required to manually copy the PIN from the AA to the EDA instead of having the PIN automatically filled in. In either case, after the PIN has been filled in on the EDA, when the user clicks "complete authorization", the EDA sends the PIN to the eDuckies website. The eDuckies web service will re-compute the PIN and let the AA know if it was valid or not.

As discussed above, the AA gives a user dynamic login and transaction authorization PINs for particular merchant sites and for particular transactions. The AA can get these PINs from the authentication server website, after having logged into it from within the AA.

In a nutshell:
    The user logs onto the authentication server website.
    Thereafter, when the user is at a participating merchant site and needs to login or authorize a transaction, the user is asked to provide a new PIN.
    The user then goes to the AA and it will show him/her the name of the merchant, and the transaction (if applicable) and provide him/her with the authorizing PIN for the login or transaction.

Figure 6:
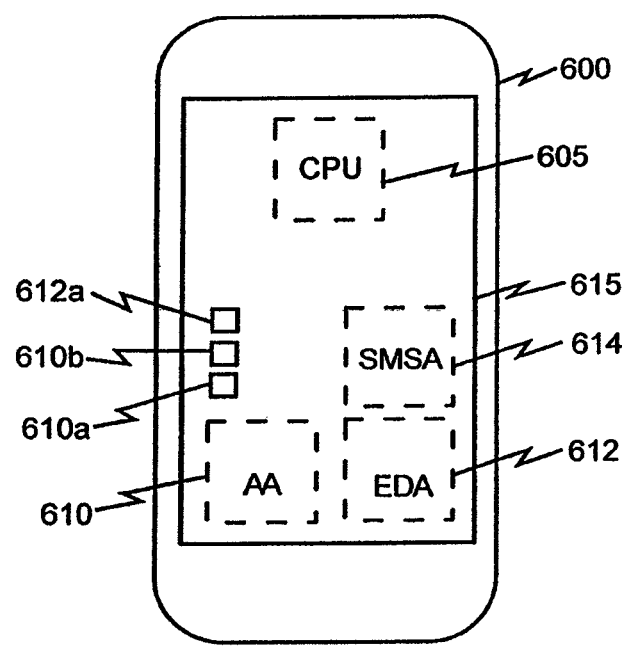
FIG. 6 depicts a smart mobile communication device, in accordance with still further extensions of our initial work.
Figure 7:
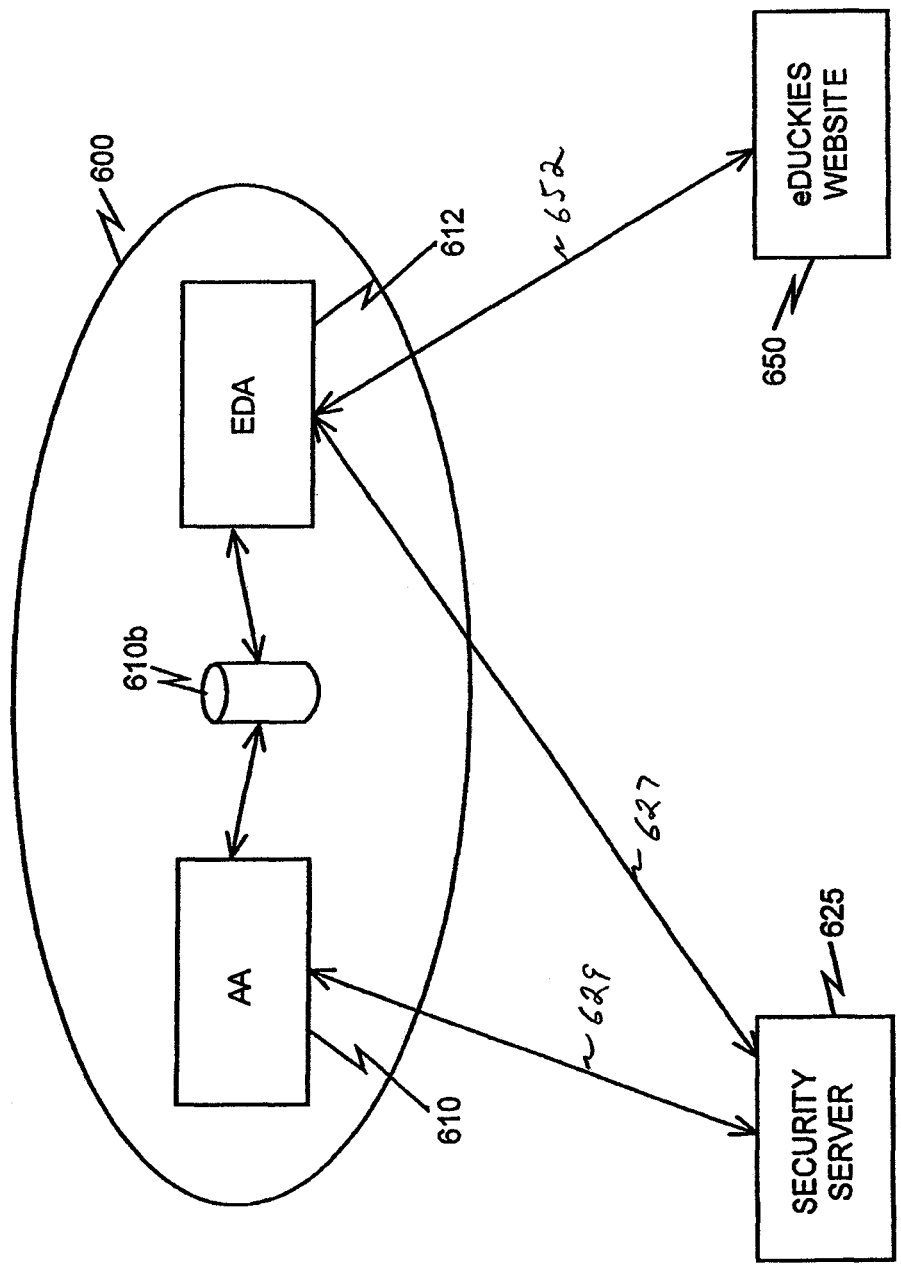
FIG. 7 depicts a simplified network architecture utilizing the FIG. 6 device, in accordance with the still further extensions of our initial work.

Referring now to FIG. 6, an SP 600 is shown. The SP 600 includes a CPU 605 and display screen 615. The SP 600 also has various SPAs executable by the CPU 605 loaded therein, including the AA 610, EDA 612, and SMS application (SMSA) 614 for text messaging. As shown AA 610 uses both public store 610a and private store 610b, and EDA 612 uses public store 612a. Referring to FIG. 7, the CPU 605 can execute the AA 610 to interact with the security server 625 via communication channel 629 and can execute the EDA 612 to interact with the eDuckies website 650 via communication channel 652 and the security server 625 via communication channel 627.

Figure 8:
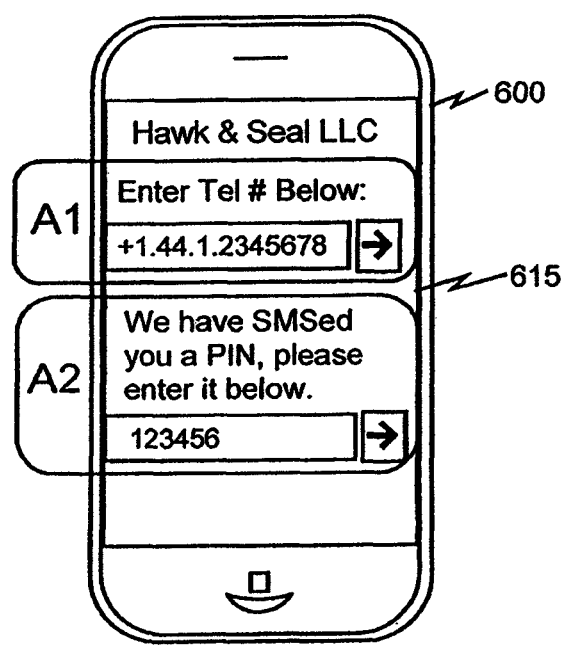
FIG. 8 depicts a display associated with an initial login, which is presented to the user on the smart mobile communication device of FIG. 6 by an authentication application being executed on that device, in accordance with the still further extensions of our initial work.

As shown in FIG. 8, when execution of the AA 610 is started, it causes the display of a logo in the area A1 of the display screen 615. The display in area A1 request a user identifier, such as the phone number, e.g. a cell phone number associated with SP 600. Preferably the user has previously been allowed to select between a manual option, which if selected would require the identifier to be manually filled in by the user, and an automatic option, which if selected would serve as a directive to the AA 610 to pre-populate the space provided in the display in area A1 with the applicable user identifier, e.g. the cell phone number of the SP. (See, in the case of the iPhone, http://arstechnica.com/apple/news/2009/01/iPhone-dev-user-phone-numbers.ars).

When the user clicks the arrow in area A1, the AA causes a post, via a first application programming interface (API) message, to authentication server 625. The authentication server 625 returns an acknowledgement indication to the AA 610 and, if the message was acknowledged, the AA 610 also causes the presentation of that shown in area A2 of the display screen 615 depicted in FIG. 7. As indicated in area A2, if success the authentication server 625 SMSs, i.e. text messages, a PIN to the user at the user's SMS address. By activating execution of the SMSA 614 by the CPU 605, the user can access his/her SMS account and retrieve the PIN from the SMS message sent by the authentication server. The user then enters the PIN in the space provided in area A2, for example by cutting and pasting the PIN from the SMS message. After entering the PIN the user clicks on the arrow in area A2 and the AA 610 sends a second API message to post the PIN.

As shown in FIG. 8, the return message from the security server 625, if success, is a session cookie, a random number we call "nonce-login" and a time-to-live (TTL), and the AA 610 causes the display shown in area A3 of the display screen 615.

It should be noted that, rather than a choice just between manual and automatic fill, the user could additionally or alternatively be allowed to select or be required to enter a user name in the area A1 and a password in area A2. It should also be understood that the choice between manual and automatic described above is only one such choice described herein. Thus, another choice between manual and automatic will be described below in the context of transaction authorization and, more particularly, with respect to whether a different PIN, i.e. a different OTP, which is associated with a transaction authorization, is conveyed by the AA to the EDA automatically or only after a manual input by the user.

Referring again to FIG. 6, the session cookie is stored privately, in private store 610b. The nonce-login and the TTL are stored publicly on a custom pasteboard, the AA public pasteboard, which is created within public store 2610a (See in the case of the iPhone, Custom Pasteboard development tool at Apple.com). When the user turns his/her "focus" to the AA 610, the AA 610 always checks the nonce and TTL. If the TTL has timed out, the AA causes the display of that shown in area A1 of the display screen 615 of FIG. 8, to begin again the log-in to the authentication server 625.

Turning again to FIG. 9, when the user is at some other SPA, e.g. the EDA or some other website application, and has been prompted for a PIN, i.e. a OTP, either for login or transaction authorization purposes, the user is redirected to the AA, as will be further discussed with reference to FIG. 11. For purposes of the description below, we will assume the user is at the EDA. In conjunction with this redirection, the EDA post information to the security server 625. This information includes whether login authentication or transaction authorization is requested, the name of the merchant, e.g. eDuckies, and, if transaction authorization is being requested, text of the transaction. If the security server has the ability to PUSH information to the AA, the security server 625 causes a post of this information to the AA. The AA 610 causes the display of either the information posted to it by the security server 625 in area A4 of FIG. 10, or what is shown in area A1 of FIG. 8 if re-login to the authentication server 625 is required. For purposes of this discussion, we assume area A4 is displayed.

Alternately, if the security server has no ability to PUSH, we rely on the user to PULL the data. This is the flow that is shown in the figures. When user clicks the arrow in area A3 of FIG. 9, the AA causes a post to the security server 625. The post includes the session cookie described above.

The security server 625 returns a success or failure message. The return message always returns a flag indicating login authentication or transaction authorization, the name of the merchant, e.g. eDuckies, a new nonce-login, a new TTL and a PIN, i.e. a OTP. If it is a transaction authorization, it also returns the text of the transaction. If success than the AA causes the display shown in area A4 on the display screen of FIG. 10.

Figure 9:
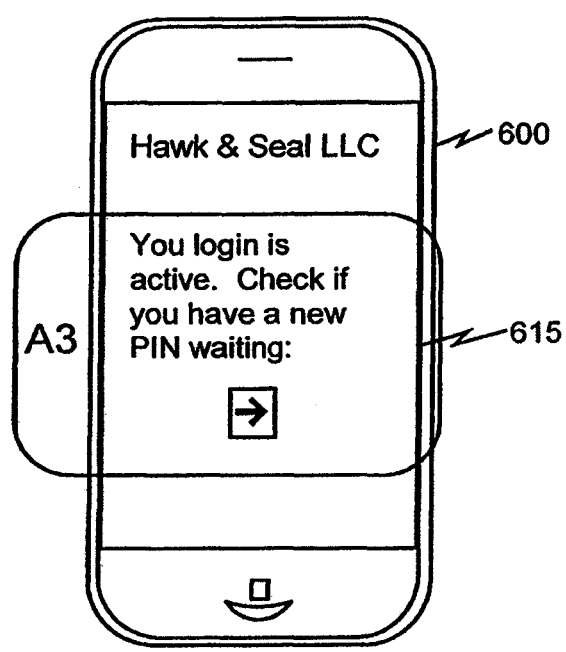
FIG. 9 depicts a display associated with another login or a transaction authorization, which is presented to the user on the smart mobile communication device of FIG. 6 by an authentication application being executed on that device, in accordance with the still further extensions of our initial work.

If the user clicks the stop sign, the user is directed back to screen shown in FIG. 9. Preferably an alarm is sent to the security server 625, to the EDA 612 and from there to the merchant website 650, and/or to some other security related website.

On the other hand, if the user clicks the arrow shown in area A4 of the display screen 615, the nonce-login and the TTL are written to the AA public pasteboard in public storage 610a. The login or transaction PIN, as applicable, is also written to the pasteboard, using the merchant identifier and PIN combination. The merchantid.PIN is written over any previous merchantid.PIN. The user is now again presented with the display shown in FIG. 9. Alternately if manual PIN transfer is the choice selected, then the user will be shown the PIN within the AA and the onus is on the user to copy it from the AA to the EDA.

It is perhaps worthwhile to reemphasize here that, as described in greater detail above, the login or transaction PIN, i.e. the login or transaction OTP, is generated by the authentication server 625 based on a secret shared by the authentication server and the website, and not shared with or known to the user. Furthermore, if transaction authorization is requested, the transaction PIN is generated by the authentication server 625 also using transaction information.

It should also be noted that the EDA checks if there is an AA public pasteboard having a login-nonce with valid TTL for the user or associated with any particular user. If not, it informs the user that he/she does not appear to have logged into the AA. Here, we have assumed that the user has logged in and that the EDA has determined that the AA public pasteboard has a valid nonce.

Figure 11:
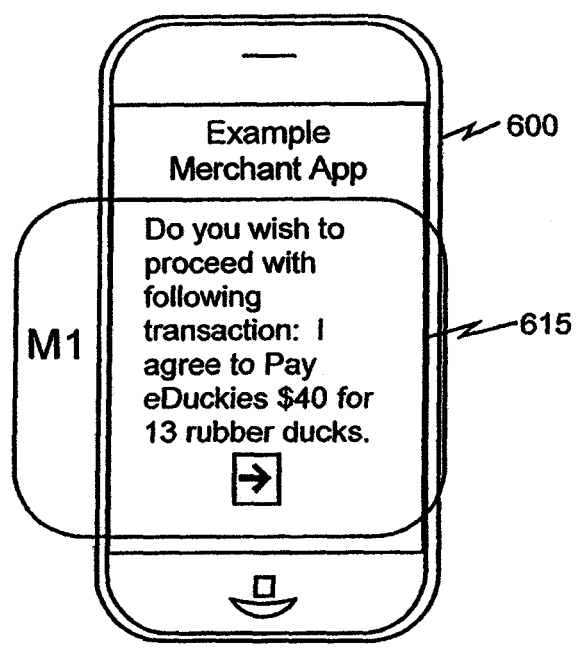
FIG. 11 depicts a display associated with transaction authorization, which is presented to the user on the smart mobile communication device of FIG. 6 by a merchant application being executed on that device, in accordance with the still further extensions of our initial work.
Figure 12:
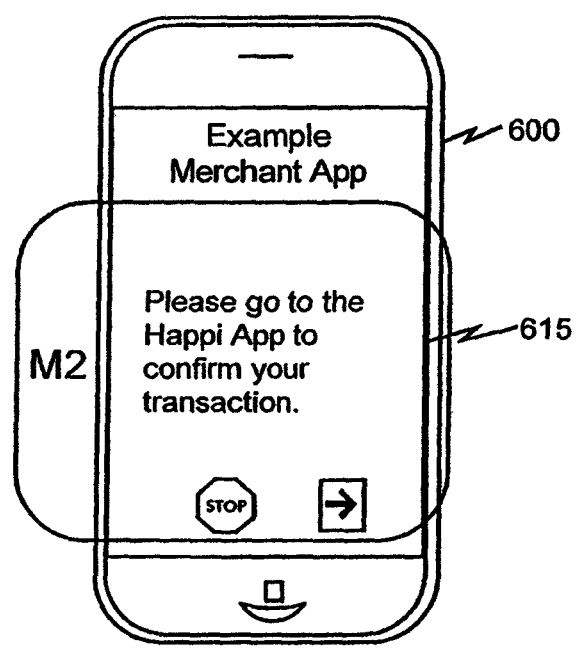
FIG. 12 depicts another display associated with the transaction authorization, which is presented to the user on the smart mobile communication device of FIG. 6 by a merchant application being executed on that device, in accordance with the still further extensions of our initial work.

We turn now to FIG. 11. For purposes of this description, we have also assumed that transaction authorization is involved. The user is at the EDA and is presented with the transaction information shown in area M1 of display screen 615. When the user clicks the arrow shown in area M1, he/she is redirected to the AA and the AA post the information relating to the merchant and transaction to the authentication server 625. The post includes the login-nonce. The security server 625 returns a success or failure. If success, then the AA presents the display shown in area M2 of the display screen 615 depicted in FIG. 12 to the user. If the user clicks on the arrow shown in area M2, the transaction authorization process described above is performed and the return message includes a string.

When focus returns to the EDA, the EDA polls the AA pasteboard to see if there is a new merchantid.PIN. Once the EDA locates it, it does a post to the eDuckies website of the string and the transaction authorization PIN. The website will return a success or a failure message, after it does its own verification of the PIN. It should be noted here that if the manual PIN transfer option is chosen, the user must enter the transaction authorization PIN into the EDA.

Extension to a Flexible Quasi Out-of-Band Authentication Architecture as Described in Parent Ser. No. 13/081,150 Application The QOOBA solution has the following benefits in terms of ease of use, total cost of ownership and, of particular interest here, security.

First, with regard to ease of use, the user has no new device to carry or password to remember, beyond having access to the phone used for out of band authentication. The user does not have to enter any cryptic transaction code into a device and type the result into the browser. Instead, the user sees the entire transaction in their QOOBA Window and can copy and paste the transaction signature with a few clicks.

Second, with regard to total cost of ownership, the QOOBA architecture significantly reduces total lifecycle costs. It requires no new hardware and, unlike a soft token, does not require per user provisioning and management of secrets. Further, as all communications between the web site and the QOOBA server, which is also referred to as the security server or authentication server, can occur via the browser, the integration requirements at the web site are extremely light. The overall costs of the QOOBA solution are designed to be significantly less than an equivalent soft token deployment, and far less than that of a physical token.

Finally, in terms of security, as will be further discussed below, the level of assurance depends on the form factor of the QOOBA Window that is used. The smartphone based QOOBA Window, i.e. the QOOBA Phone Window, provides the highest assurance, but even the zero download pop-up, i.e. the QOOBA Pop-up Window, significantly raises the bar for an attacker. The software QOOBA window, i.e. the QOOBA Software Window, is likely to be satisfactory for almost all risk levels.

Further, by implementing the QOOBA solution using the flexible architecture described below, the web sites in the QOOBA Network are allowed to request or select the form factor appropriate for the transaction. For instance, a user can simultaneously have a QOOBA Window on their smartphone as well as on their desktop. While most transactions can be sent to their desktop QOOBA Software Window (which is far more convenient), the highest risk transactions can be sent to their smartphone QOOBA Phone Window.

The flexible QOOBA architecture will now be described in greater detail and its security properties analyzed.

Figure 13:
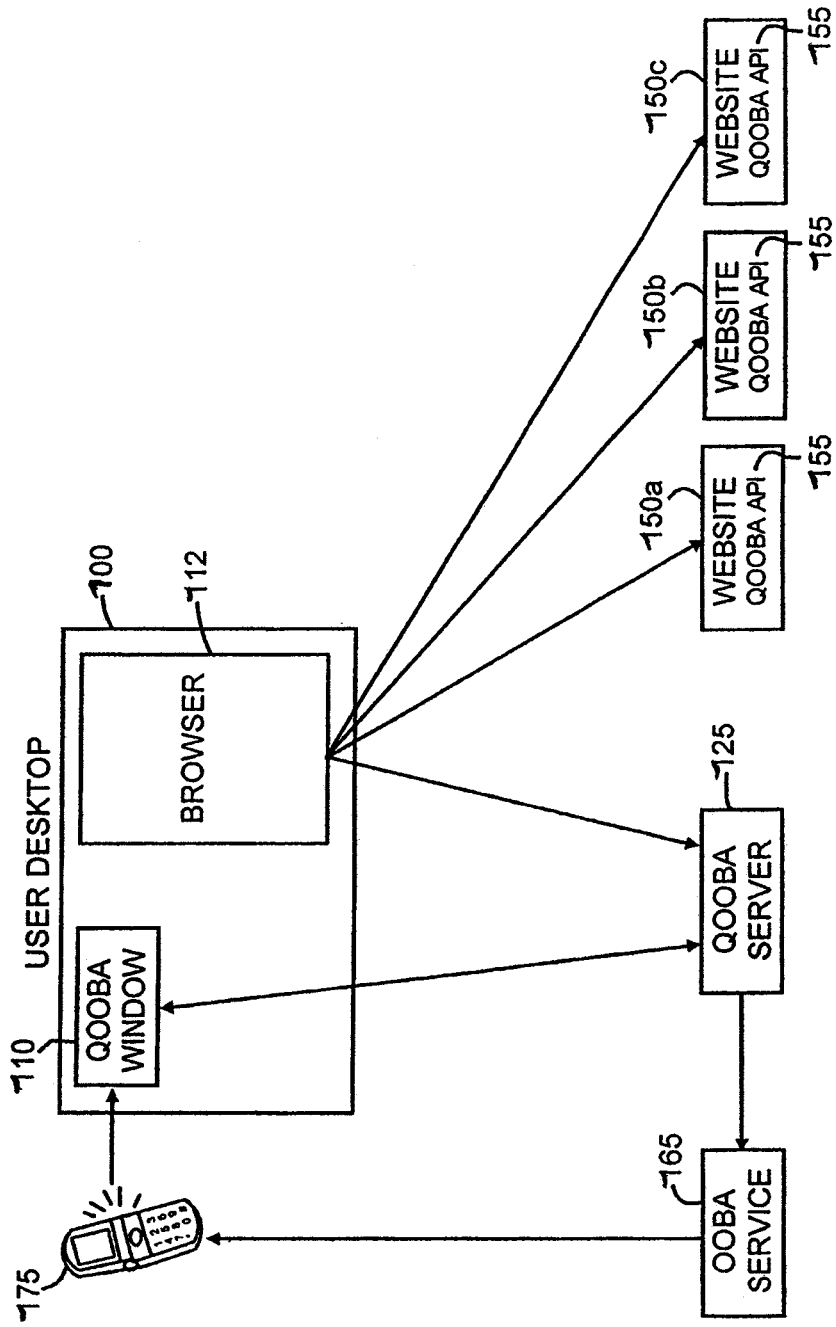
FIG. 13 depicts the main components of the flexible quasi out of band authentication architecture, in accordance with additional extensions of our initial work.

Referring now to FIG. 13, the QOOBA system consists of a desktop personal computing device 700 having the QOOBA Window 710 and a Browser Window 715 executing and displayed thereon, a QOOBA Server 725 and websites 750a, 750b and 750c, each having a QOOBA API 755 operable thereon. Also included in the system as shown is an OOBA Service 765, which is utilized by the QOOBA Server 725 to convey out of band communications, e.g. authentication credentials, to the user via the user's SP 775.

As described in more detail in the applications referenced above, the user activates the QOOBA Window 710, typically by using OOBA service 765, and establishes a temporary session with the QOOBA Server 725. Websites 750a-c participating in the QOOBA Network go through a onetime set up process to establish a shared secret with the QOOBA Server 725. When the user is at any of the websites 750a-c, he/she can use the QOOBA API 755 to request transaction authentication by sending the encrypted transaction to the QOOBA Server 725 via user's Browser Window 712.

The QOOBA Server 725 will display the transaction to the user in the QOOBA Window 710, and if requested, also display in the QOOBA Window 710 a transaction signature derived from the transaction, the secret shared between the QOOBA Server 725 and the applicable website 750a, 750b or 750c, and other information. The user is optionally given the choice of accepting or rejecting the transaction. Acceptance can be signaled passively by taking no action, by clicking OK within the QOOBA Window 710, or by copying and pasting the transaction signature from the QOOBA Window 710 into the web application displayed in the Browser Window 712. If the transaction signature from the QOOBA Window 710 is pasted into the web application displayed in the Browser Window 712, the web site can verify the signature using the transaction, the secret shared between the QOOBA Server 725 and the applicable website 750a, 750b or 750c, and other information, as has been described in more detail in the applications referenced above.

The user interface to the QOOBA Server 725 remains largely constant regardless of the browser and/or operating system (OS) being used and the form factor of the QOOBA Window 710. The only use-case in which the user experience deviates is when the user is browsing on a SP, where the QOOBA experience is optimized for the device.

As noted above, the QOOBA Window 710 can be implemented in one of at least three form factors, a browser pop-up, which we sometimes refer to as the QOOBA Pop-up Window a which does not require any software download, a small application that is installed on the desktop, which we sometimes refer to as the QOOBA Software Window, or as a smart phone app, which we sometimes refer to as the QOOBA Phone Window.

The same user might well be using different form factors at different times. For instance, a user who has the software QOOBA Window installed, and uses that most of the time, might use the browser pop-up QOOBA Window while at some other desktop (roaming). For certain high risk transactions, the website might require showing the transaction on the SP QOOBA Phone Window, while most transactions are shown in the desktop QOOBA Software Window. The look and feel of the QOOBA Window 710 is entirely customizable by the particular QOOBA Network. An implementation for a bank intended solely for its own websites might look and feel very different from an implementation by a payment service that offers authentication into various eCommerce websites 750a-c. While we are describing numerous elements, it should be understood that most of them are optional.

Unlike a soft token, the QOOBA Window 710 itself does not contain any user secrets. There is provision to personalize it for the user, and perhaps eventually there will be QOOBA Windows with different "skins". Depending on the form factor, the QOOBA Window 710 can be automatically started for the user at boot up time, or must be manually started by the user clicking on an application icon, e.g. for the software or SP versions, or on a bookmark, e.g. for the pop-up version.

Figure 14:
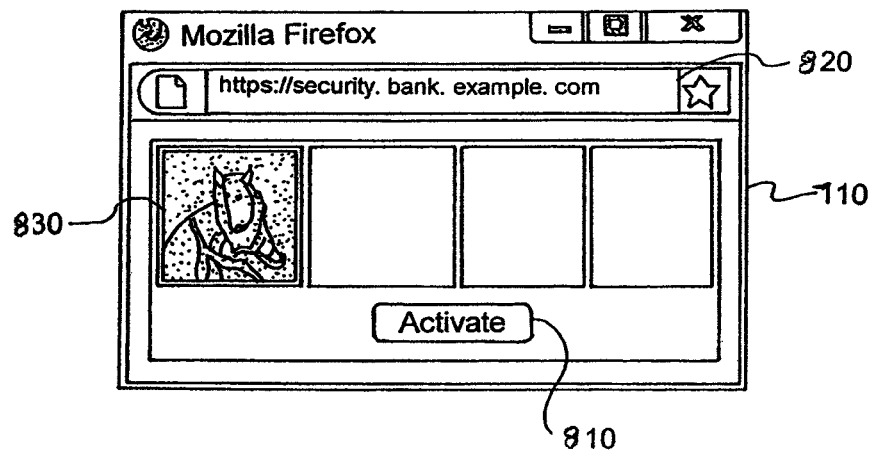
FIG. 14 shows a sample QOODA window before activation, which is presented to the user on the user desktop device of FIG. 13, in accordance with the additional extensions of our initial work.

An example of this is shown in FIG. 14. The user activates the QOOBA Window 710, by performing OOBA, for instance by entering a PIN sent via a short messaging service (SMS), now more commonly referred to as a text messaging service, to the user's mobile phone 775. The user enters the PIN in another (not shown) QOOBA Window 710, and a keyed hash of it is sent to the QOOBA Server 725 over an encrypted connection.

The encryption is at two levels. First, all traffic is run over SSL. Second all traffic is also encrypted at the application level using a key derived from the PIN. We also note that other, non-OOBA, forms of authentication can be used at this step; for instance to integrate the QOOBA solution with existing OTP deployments. The analysis here however assumes that OOBA is used.

As shown in FIG. 14, at this point, in addition to the activation button 810, the QOOBA Window 710 includes multiple other elements. One, is a URL Bar 820, showing the address of the QOOBA Server. Another is a personalization image 830 which the user chooses in a one-time step during the initial sign-up for QOOBA. The primary purpose of this personalization image is to increase the difficulty of attacks where an attacker attempts to mimic a browser 712 pop up based QOOBA Window 710. Once activated, the QOOBA Window 710 will show users their transactions as they are performed on the websites that are part of that QOOBA Network, i.e. websites 750*a*-*c*.

It should be noted that, as the QOOBA Window 710 and the QOOBA Server 725 will be communicating over SSL, it is highly preferred and hence recommended that EV-SSL certificates be used. Both SSL and EV-SSL certificates are well known and understood by those skilled in the art.

Figure 15:
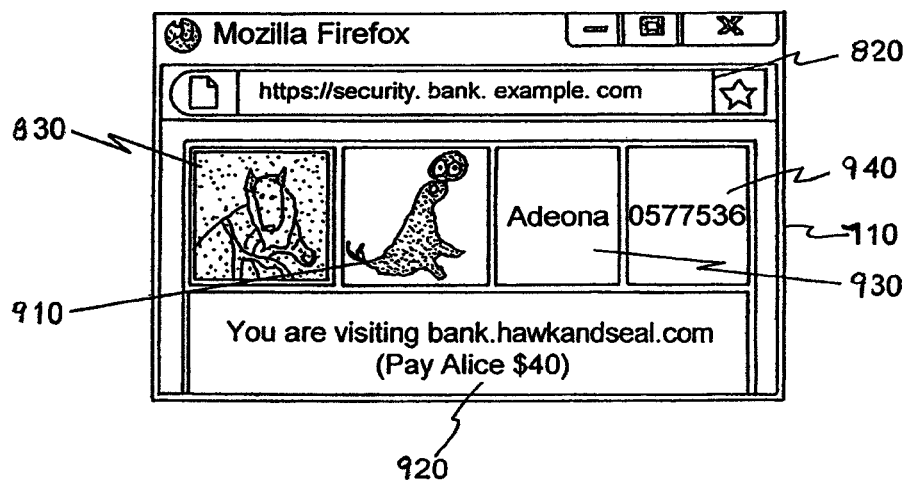
FIG. 15 shows a sample QOODA window during use but before transaction signing, which is presented to the user on the user desktop device of FIG. 13, in accordance with the additional extensions of our initial work.

An example of a QOOBA Window 710 displaying a transaction is depicted in FIG. 15. As shown in FIG. 15, the QOOBA Window 710 has a number of elements, most of which are optional. These elements include the URL Bar 920 showing the address of the QOOBA Server and the personalization image 930 which the user chose during the initial sign-up for QOOBA authentication. The elements additionally include a symbol 910 that conveys the impression of "flashing green" when the user is transacting at a website that is part of the QOOBA Network, e.g. website 750*a*, 750*b* or 750*c*. The elements also include a space 920 where the name of the website the user is transacting at can appear. This website name can be the domain name as shown, or the name of a merchant, e.g. Hawk and Seal Bank Ltd. (not shown). As shown in FIG. 15, the space 920 includes a display of the transaction the user is being asked to sign. The elements further include a comfort word 930, which is a random dictionary word that will be shown to the user both in the QOOBA Window 710, and next to the transaction displayed in the Browser Window 712. Finally, the elements may include a transaction signature 940. As will be understood, if this were an example of a QOOBA Window 710 displaying a login rather than transaction screen, the element 940 might be characterized as an authentication PIN rather than transaction signature, which likewise serves as a PIN. In any event, as has been described above and will be further described below, the PIN 940 is computed at the QOOBA Server 725 and sent to the QOOBA Window 710. The user simply cuts and pastes it from the Window 710 into the part of the web application display in the Browser Window 712 that asks for the signature. As discussed above, the space occupied by the PIN 940 can also be used to allow the user to signal to the QOOBA Server 725 that the transaction is valid/invalid, for example by confirming that he/she wishes to proceed with or refuses to confirm the transaction. However, it should be recognized that the QOOBA Window 710 can also be used to simply show the user the transaction. Thus, the QOOBA Window can take different forms, for example, in one providing the user with a PIN for logging-in to or signing a transaction with a website, in another requesting the user's confirmation of a transaction, and in still another simply presenting the user with a display of a transaction, without the user being required to do anything further.

It should be understood that there are two modes in which the QOOBA Window 710 can operate. A PUSH mode, in which the transaction and PIN are simply pushed to the QOOBA Window 710 without any action by the user, and a PULL mode, in which the user must click on a "get transaction" button (not shown) to retrieve the transaction and PIN. While the former is more convenient for the user, there are some situations where the PULL mode is more apropos.

For instance, in the iPhone implementation of the QOOBA Window 710, the PULL mode is used as SP apps, in all except the most recent release of that OS, do not permit multi-tasking.

Turning now to the QOOBA Server 725. The QOOBA Server 725 has two primary functions. The first is to interact with the user and OOBA Service 765 to activate QOOBA Window 710 for the user. The other is to interact with pre-registered web sites 750*a*-*c* to receive transactions and display them to the user in the QOOBA Window 710.

The QOOBA Server 725 does not maintain any user information. This means that the QOOBA Server 725 has to be provided the phone number, e.g. the number of the SP 775, for the user, either by the user or by performing a look up based on a UserID of the user. The QOOBA Server 725 will then interact with the OOBA service 765 to send the user a QOOBA Server PIN (not shown) that is used to set up a secure session between the QOOBA Server 725 and QOOBA Window 710.

Websites that are part of the QOOBA Network served by the QOOBA Server 725, such as websites 750*a*-*c*, must be pre-registered with the QOOBA Server 725. The QOOBA Server shares a secret-key with the server at each of the pre-registered websites 750*a*-*c*. While we have not described the use of public key cryptography for key exchange, the QOOBA Network is easily adaptable to make use of such cryptography. The QOOBA Server 725 can be implemented as an on-premise solution or as a service available through an OOBA partner.

Participating websites 750*a*-*c* execute the QOOBA API 755 to use the QOOBA network. The details of the QOOBA API 755 will be well understood by those skilled in the art from the functional description provided above as well as below, and can be easily implemented using well known and routinely used programming techniques. Accordingly, the details are not described herein because they are unnecessary to those skilled in the relevant area of art and are therefore considered beyond the scope of this document.

The functional steps that the website performs in accordance with the QOOBA API 755 are as follows.

1. Call the qooba_transaction_request( ) API which returns the encrypted qooba_transaction_request. In addition to the transaction itself (which could simply be a request for a login PIN), the website 750*a*, 750*b* or 750*c* indicates whether it wishes (i) to simply display the transaction to the user or (ii) to ensure the user clicks "OK" in the QOOBA Window 710, or provide some corresponding indication that he/she approves the transaction displayed in the QOOBA Window 710, or (iii) to obtain a transaction signature. It will be recognized that in the example above, the QOOBA Window 710 in FIG. 15 makes clear that the website had indicated a desire to obtain a transaction signature. However, had the website indicated a desire to ensure the user clicks "OK" in the QOOBA Window 710, or to provide some corresponding indication that user approves the transaction displayed in the QOOBA Window 710, the term "OK" or "Approved", etc. would have been displayed in the QOOBA Window 710 shown in FIG. 15, in lieu of the signature PIN 940. On the other hand, had the website indicated a desire to simply display the transaction to the user, neither the signature PIN 940 nor a term such as "OK" or "Approved", etc. would have appeared in the QOOBA Window 710 shown in FIG. 15.

2. The encrypted transaction is then posted to the QOOBA Server 725 via the user's browser 712.

3. The QOOBA Server 725 decrypts the transaction, verifies authenticity, and then shows the transaction to the user in the QOOBA Window 710. As noted above, if a transaction signature is requested, the QOOBA Server 725 will compute the signature PIN 940 and display it to the user.

4. The QOOBA Server 725 then prepares an encrypted qooba_transaction_response and sends it back to the Browser 712 in the response to the original POST, which is then transmitted back to the website 750a, 750b or 750c, as applicable.

5. The applicable website 750a, b or c, then calls the qooba_transaction_verify( ) API which will return the result to that website.

Figure 16A:
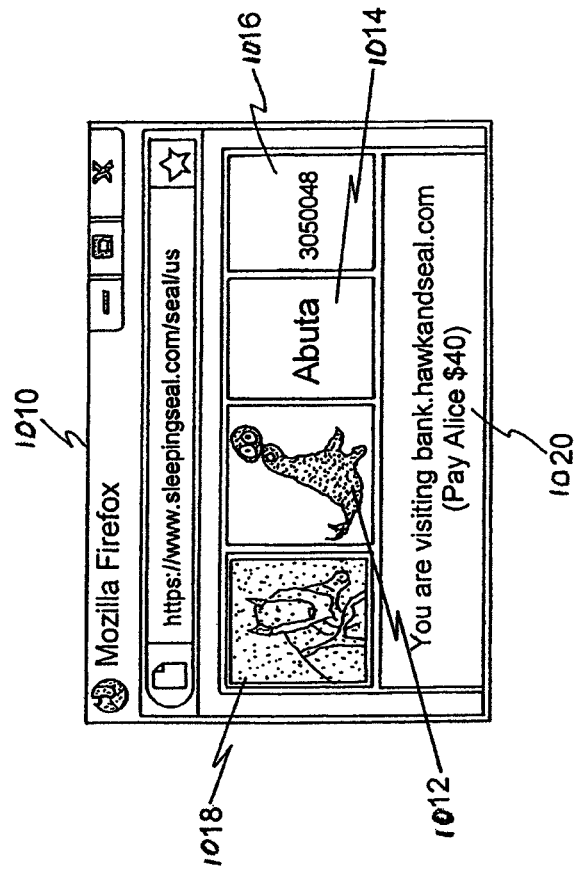
FIGS. 16, 16A and 16B show sample QOODA windows during transaction signing, which are presented to the user on the user desktop device of FIG. 13, in accordance with the additional extensions of our initial work.
Figure 16:
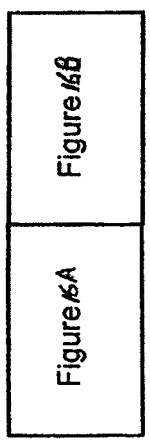
Figure 16B:
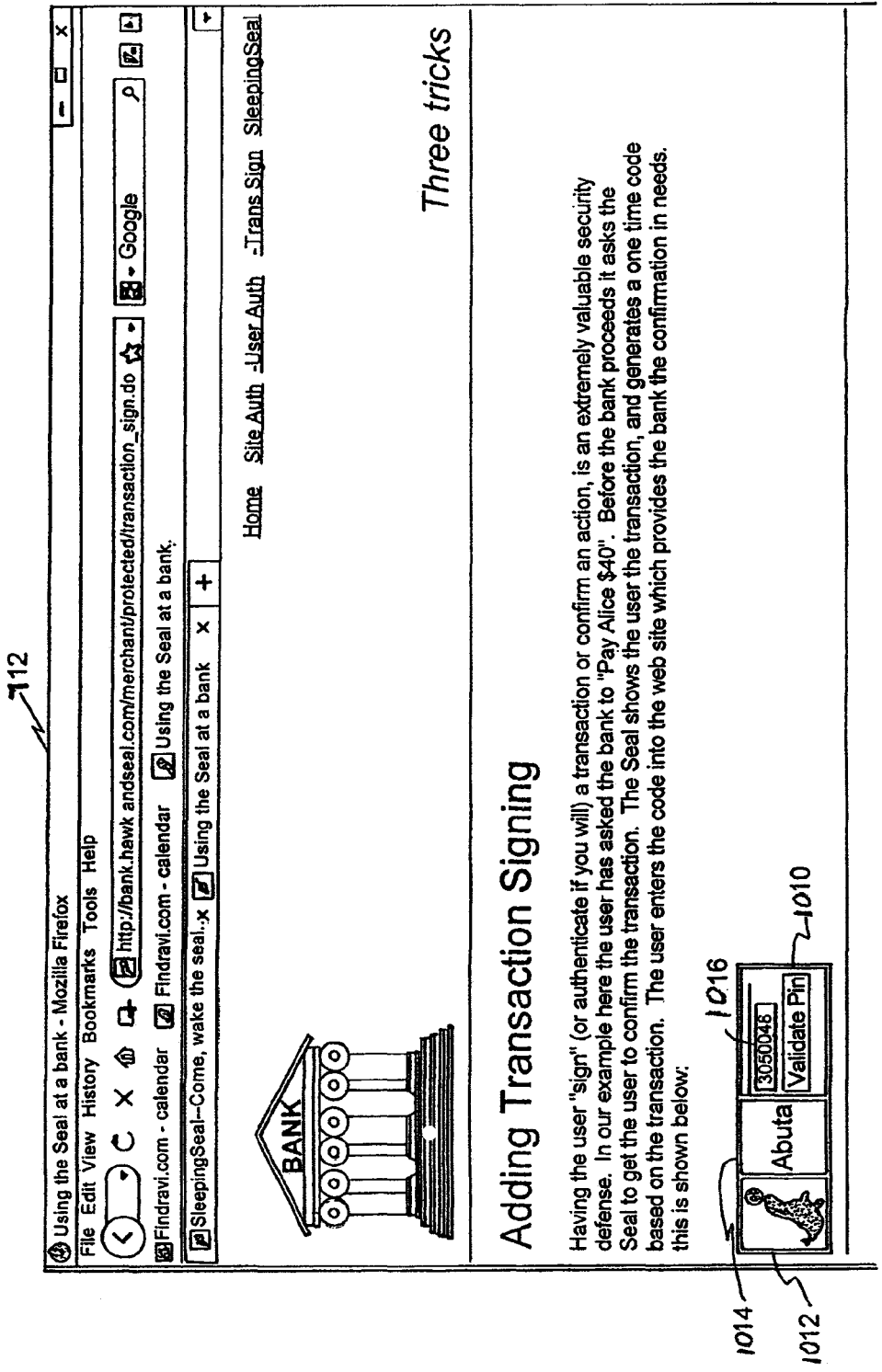

FIG. 16 shows examples, in FIGS. 16A and 16B, of what the user interface could look like in the Browser Window 712 during successful completion of the transaction. In the example shown in FIGS. 16A and 16B, in the Browser Window 712, adjacent to the actual transaction the user is performing, an iframe 1010, which handles the passing of the encrypted transaction request and response, also displays the success symbol 1012 and comfort word 1014 received from the QOOBA Server 725. In this example, the user has cut and pasted the transaction signature 1016 from the QOOBA Window 710, which in FIG. 16A also displays the personalized image 1018 and transaction 1020, along with the success symbol 1012, comfort word 1014, and transaction signature 1016 that has been pasted into the iframe 1010.

Figure 17:
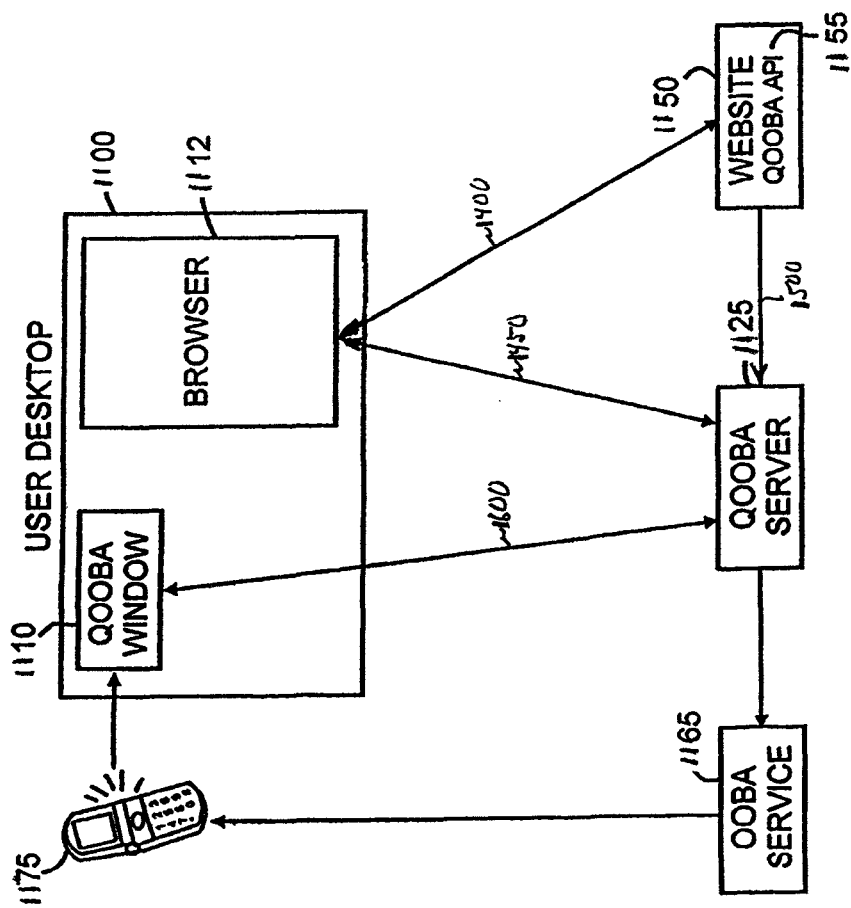
FIG. 17 depicts the main components of a flexible quasi out of band authentication architecture that can be implemented with key management functionality, in accordance with other additional extensions of our initial work.

Extension to Key Management as Described in Parent Ser. No. 13/089,430 Application In yet another extension of our work, we overlay components for key management on the QOOBA architecture. We will describe this extension with reference to FIGS. 17 and 18. As shown in FIG. 17, the QOOBA system here consists of a desktop personal computing device 1100 having the QOOBA Window 1110 and a Browser Window 1112 executing and displayed thereon, a QOOBA Server 1125, and a Web Service 1150, which has the QOOBA API 1155 operable thereon. It should be understood that in a practical implementation there would typically be multiple web services at multiple different websites. Also included in the system as shown is an OOBA Service 1165, which is utilized by the QOOBA Server 1125 to bootstrap authentication of the user using the user's phone 1175, which may be a landline, cell phone or smart phone.

As has been described above, the user activates the QOOBA Window 1110, typically by using out of band authentication via OOBA Service 1165, and establishes a session with the QOOBA Server 1125. Web Service 1150 participates in the QOOBA Network and goes through a onetime set up process to establish a shared secret with the QOOBA Server 1125, which is not shared with or known by the user. When the user has an active session with the QOOBA Server 1125 via communication channel 1450 and is also at the Website 1150 via communication channel 1400, the Website 1150 can use the QOOBA API 1155 to request, via back end communication channel 1500, transaction authorization by sending the transaction directly to the QOOBA Server 1125. The QOOBA Server 1125 then displays the transaction to the user in the applicable QOOBA Window, which is shown in FIG. 17 to be Window 1110.

The QOOBA Server 1125 can present various information to the user in the displayed QOOBA Window 1110. For example, the QOOBA Server 1125 can display a transaction to the user in the QOOBA Window 1110 and, if requested, also display in the QOOBA Window 1110 a transaction signature, i.e. an electronic signature, derived from the transaction, the secret shared between the QOOBA Server 1125 and the Website 1150, and other information. This is accomplished via communication channel 1600. The user is optionally given the choice of accepting or rejecting the transaction. Acceptance can be signaled passively by taking no action, by clicking OK within the QOOBA Window 1110 and sending a signal via communication channel 1600 back to the QOOBA Server 1125, or by copying and pasting the transaction signature from the QOOBA Window 1110 into the web application displayed in the Browser Window 1112 and then sending it back to the Web Service 1150 via communication channel 1400. If the transaction signature from the QOOBA Window 1110 is copied into the web application displayed in the Browser Window 1112, the Website 1150 can verify the signature using the transaction, the secret shared between the QOOBA Server 1125 and the Web Service 1150, and other information. It will be recognized that, if desired, the transaction signature could be shown to the user within a QOOBA Window (not shown) on the smart phone, which is sometimes referred to as the QOOBA Phone Window, rather than the QOOBA Window 1110. The user copies this transaction signature into their browser window 1112 and sends it to the Web Service 1150. As the transaction signature or PIN is derived from a secret shared between the QOOBA Server 1125 and the Web Service 1150 (and never revealed to the user), the Web Service 1150 can recalculate the transaction signature independently and thus confirm the transaction. It will be observed that this achieves the same security effect of a transaction authenticator system, but there is no per user provisioning of secrets.

Figure 18:
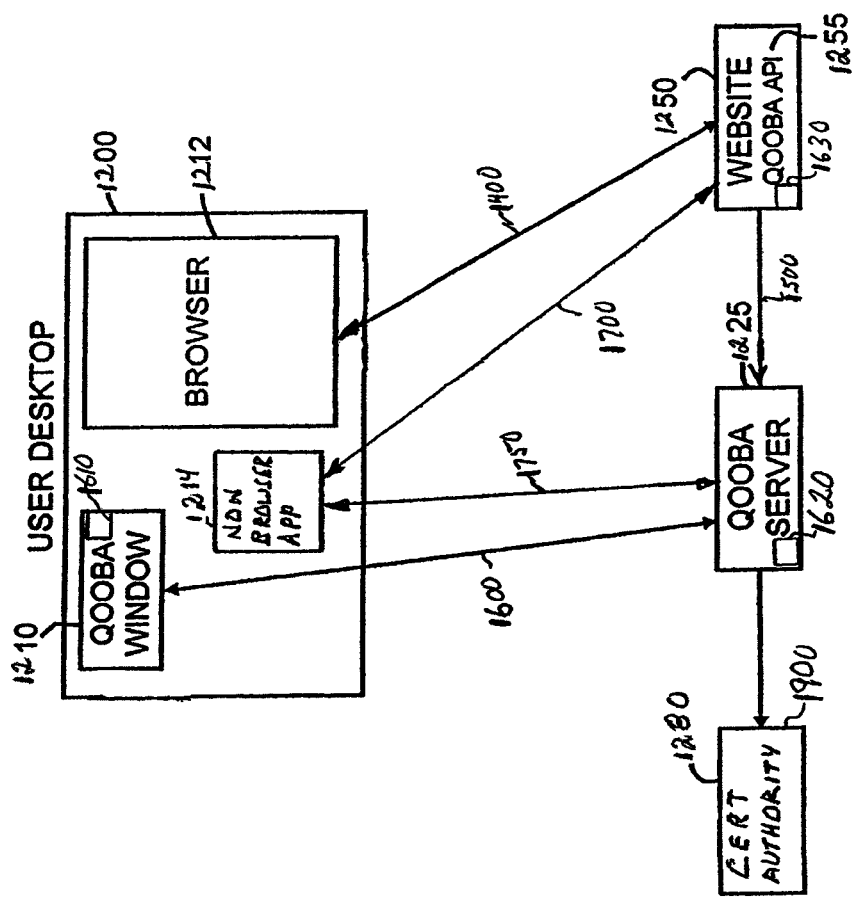
FIG. 18 shows the flexible quasi out of band authentication architecture of FIG. 17 with the key management functionality layered on top, in accordance with the other additional extensions of our initial work.

Turning to FIG. 18, central to the QOOBA system of FIG. 17 is the establishment of a secure, encrypted and independent channel 1600 between the QOOBA Window 1110 on a user's desktop 1100 or the QOOBA Phone Window (not shown) on the user's smart phone 1175 and the QOOBA security server 1125. As described above, the QOOBA Window is used to show the user transactions and provide the user with the opportunity to confirm, e.g. approve, the transaction.

As shown in FIG. 18, the QOOBA concept is extended to include the QOOBA Key Management Logic-Client (KMLC) 1610 on the user's desktop 1200, the QOOBA Key Management Logic-Server (KMLS) 1620 on the QOOBA security server 1225, the QOOBA Key Management Logic-API (KMLAPI) 1630 on the Web Service 1250, and the possibility of "non-browser" desktop or smart phone software (e.g. Acrobat Reader) 1214. KMLC 1610 and KMLS 1620 communicate over the secure QOOBA channel 1600 between the QOOBA Window 1210 and the QOOBA security server 1225. KMLS 1620 and KMLAPI 1630 communicate over the back-end communication channel 1500 between the QOOBA security server 1225 and the Web Service 1250.

Within the above described framework, key generation proceeds as follows. At some point after the QOOBA Window 1210 is activated, the KMLC 1610 generates a private/public key pair, e.g. Du/Pu and stores the private key Du securely (typically in memory). KMLC 1610 sends the public-key Pu to the QOOBA Server 1225, where the request is intercepted by the KMLS 1620. A digital certificate ("Cert"), which includes the user's public key Pu, is prepared by KMLS 1620, and one of two things happens.

If KMLS 1620 is capable of acting as an intermediate or root certificate authority, it signs the certificate and returns the signed certificate to KMLC 1610, which maintains it locally (preferably in memory). For example, KMLS 1620 could sign the Cert with the private key Ds of it's private/public key pair Ds/Ps, such that [Cert]Ds is returned to KMLC 1610.

On the other hand, if KMLS 1620 acts as a "registration authority", it forwards the certificate request to an external certificate authority 1900, which creates the certificate and returns it to KMLS 1620, which in turn forwards the certificate back to KMLC 1610, which maintains it locally (preferably in memory). In such a case, the Cert will be signed by the certificate authority with the private key Dca of it's private/public key pair Dca/Pca such that [Cert]Dca is returned to KMLS 1620. KMLS 1620 then forwards the received signed Cert, i.e. [Cert]Dca, to the KMLC 1610.

It is preferable in either instance for the Cert issued to be relatively short lived, i.e. temporary, and coincident with the life of the QOOBA session itself. By making it simple to do key generation coincident with activation, the need to store digital certificates and private keys locally over an extended period is avoided.

In some situations, as will be discussed in more detail below, the private key and certificate may be needed by other applications, e.g. browser 1212 or document processor 1214, on the same desktop (or mobile device). If the underlying operating system supports standard key stores, as MS Windows™ or Apple MacOS™ do, then the KMLC 1610 can be tasked with committing the keys to the key store and deleting them when appropriate.

In addition to the above described generation of keys, i.e. asymmetric keys, suitable for public key cryptography, the key management system can also generate and distribute symmetric keys. Central to this is a function Shared_Secret_Generator( ) incorporated within KMLS 1620, that takes as input such factors as the UserID (perhaps the user's hard line or cell phone number), a long lived secret known only to the QOOBA Server 1225, and other miscellaneous parameters, and produces as output the shared_secret K. It is important to note that for a given set of inputs the same shared secret will be computed deterministically. Different authenticated entities can request the KMLS 1620 to provide them with the appropriate symmetric key by providing the KMLS 1620 the applicable input parameters.

Note that, depending on the application, QOOBA Key Management Logic may make use of one or both of the asymmetric (i.e. public) key cryptography and symmetric key cryptography capabilities described above.

Having described the key management system including its key generation capabilities, we turn our attention to three example applications that make use of these capabilities.

The first example addresses the use of QOOBA for digital signing. For certain applications, digital signing using public key cryptography is considered more appropriate than electronic transaction signing. To accomplish digital signing, the end user browses in browser window 1212 and executes a transaction at a Web Service 1250. The Web Service 1250 uses the KMLAPI 1630 to make a request for transaction signing with "digital signing" required. This request is sent over secure back-end communication channel 1500 to KMLS 1620. The request is then send from KMLS 1620 to KMLC 1610 via secure channel 1600, with an indication that a digital signature is required. The QOOBA transaction signature PIN, i.e. a OTP, is optionally generated by the QOOBA Server 1225 and sent along with the digital signature request. It should be understood that, as described above, the PIN could, if desired, be sent by the QOOBA Server 1225 to a QOOBA Window, similar to QOOBA Window 1210, displayed on the user's smart phone (not shown), via a persistent connection similar to connection 1600, rather than to QOOBA Window 1210 displayed on the desktop 1200 as shown.

The QOOBA Window 1210 shows the user the transaction as usual, and optionally requires the user to copy the transaction signature PIN, i.e. the electronic signature, into the browser window 1212. In parallel the KMLC 1610 computes a hash on the transaction ("HashTran") and computes a digital signature using the user's private key Du, which was previously stored in memory, the result being [HashTran]Du. This process could happen behind the scenes or by asking the user to agree to sign the transaction. In either case, the private key Du is applied to the hashed transaction [HashTran]. The digitally signed hash of the transaction [HashTran]Du is then sent, via secure channel 1600, from KMLC 1610 to KMLS 1620, along with the digital certificate [Cert]Ds or [Cert]Dca.

KMLS 1620 can optionally perform a validation of the signature by applying the user's public key Pu to the digital signature [HashTran]Du to obtain HashTran, and comparing it to an independently generated HashTran. Whether or not validation is performed, the KMLS 1620 forwards the signature, i.e. [HashTran]Du, and the certificate, i.e. [Cert]Ds or [Cert]Dca, to KMLAPI 1630 via secure channel 1500.

KMLAPI 1630 can recompute the hash HashTran and verify the signature using the user's public key Pu included in the digital certificate, Cert. Thus, the KMLAPI 1630 applies the KMLS 1620 public key Ps to [Cert]Ds, or the Certificate Authority public key Pca to [Cert]Dca, to recover Pu. It then applies the recovered Pu to [HashTran]Du to recover HashTran and compares it to an independently generated HashTran to verify the signature.

Note that in the above description, the hash is created at KMLC 1610. However, it could as easily be created at KMLAPI 1630 or KMLS 1620, though it is likely that each entity would re-compute it to be assured of its authenticity.

In this example, the entire transaction comes to the QOOBA Window 1210. If, on the other hand, a document needs to be signed using this approach, then it is possible to extend the functionality to have the KMLC 1610 commit the private key and public key to the key stores available on the user's desktop 1200, which would make the keys available to other applications, e.g. browsers 1212 or non-browser apps 1214. KMLC 1610 would be responsible for deleting the user keys from the key store at the appropriate time.

In the second example, QOOBA is used for key distribution. It frequently happens that data is encrypted and forwarded to the recipient in a store and forward system, such as email. For instance, regulations require that documents, such as financial statements or health records, must be sent encrypted if sent as email attachments. Many applications, e.g. WinZip™ and Acrobat Reader™, have built in password based encryption capabilities. The question then arises as to how the decryption password is sent to the user. One approach is to a priori agree on a shared password. Drawbacks of this approach are that a compromised password can be used to decrypt many documents, and it is also difficult to require complex passwords, as the user is likely to forget the password. Described below are three approaches of using the QOOBA Key Management system to solve this problem.

In the first approach, a document identified uniquely, for instance by a unique DocumentID, is encrypted with a key derived from a PIN, e.g. an eight character alpha-numeric PIN, by a Web Service 1250 and then sent to a user, e.g. via email. For purposes of this discussion, a DocumentID is a unique value associated with particular combinations of sender identification, recipient identification and document identification. When the user opens the document using some application 1214, typically a software application, on his/her desktop, e.g. WinZip™ and Acrobat Reader™, the program sends a signal to the Web Service 1250 indicating that the user is attempting to read the particular document. Although the application 1214 could instead be the browser 1212, for purposes of this discussion and as shown in FIG. 18, it is assumed to be other desktop software.

The Web Service 1250 retrieves the PIN with which that document referenced by DocumentID was initially encrypted, and then uses KMLAPI 1630 to send the PIN to the QOOBA server 1225. The QOOBA server 1225, using KMLS 1620, forwards the PIN to KMLC 1610 and the PIN is then displayed to the user within the QOOBA Window 1210.

The user copies the PIN into the application 1214 and decryption proceeds as normal. It should be observed that, in general, no changes to the application 1214 are required. The ability to trigger a message to the Web Service 1250 when opened is functionality that is already built into many applications (e.g. Adobe Reader).

One drawback of the above approach is that the Web Service 1250 has to maintain a list of DocumentIDs and PINs. One way to solve this problem is to use a second approach and have the key with which each document is encrypted be the result of a function, which takes as input the DocumentID and a long term secret known only to the Web Service 1250. This way the key can be generated dynamically after the user attempts to open the document as described in the first approach.

A drawback of the second approach is that there is an assumption that the Web Service 1250 is available and on-line when the document is opened. As some of the systems that generate and distribute documents are back-end batch systems, this assumption may not always be applicable. In a third approach, QOOBA key management shared secret generation capability can be used to solve the problem as follows.

The Web Service 1250 sends the QOOBA Server 1225, either one at a time, or more likely in a batch file, the DocumentIDs it wants to encrypt. For purposes of this discussion it will be assumed that the file contains envelope information such as sender and recipient IDs. KMLS 1620 uses the Shared_Secret_Generator( ) described above to compute encryption keys for each DocumentID. For example, key K1 for one DocumentID, K2 for another DocumentID, K3 for yet another DocumentID, etc. These keys are then returned by the KMLS 1620 to Web Service 1250. The Web Service 1250 then encrypts each respective document with the applicable key and sends the encrypted document, e.g. via email, to the respective applicable users.

The applicable user uses the other desktop software 1214 to open the document, which triggers a request for a key directly to the QOOBA Server 1225 over a secure web connection 1750, which is another communication channel. It should be noted that this is a direct connection 1750 from the non-browser software 1214 to the QOOBA Server 1225 and not through QOOBA Window 1210.

This action results in the KMLS 1620 using the Shared_Secret_Generator( ) to re-compute the applicable encryption key, e.g. K1, K2, K3 etc. The applicable key is then sent to KMLC 1610 and shown to the user in QOOBA Window 1210 for copying into the Non-Browser Window 1214 as described earlier.

While we have described the above using a non-browser software application (e.g. Acrobat Reader) as our example, the same functionality can be used for browser based web applications.

QOOBA key management can also be used for "seeding" OTPs and Transaction Authentication Tokens. OTPs and Transaction Authentication token authenticators all require a key which is stored in the token and is also stored at the back-end system. Managing these keys (which are commonly referred to as "seeds") introduces costs and complexity. The QOOBA key management system can be used to greatly simplify this process.

For purposes of this discussion it is assumed that a token authenticator (not shown) is implemented as hardware, software or as a mobile phone app. The token starts in an inactive state with no seed present (or a seed refresh is required). A request is made either directly within the QOOBA Window 1210 by the user or directly from the token to the QOOBA Server 1225 or to an external Web Service 1250 requesting a seeding event. Some unique identifier identifying the UserID is provided to the QOOBA Server 1225 or Web Service 1250, as applicable.

The KMLS 1620 within the QOOBA Server 1225 uses the unique UserID and other information, including the long term secret known only to KMLS 1620, as inputs into the Shared_Secret_Generator( ) to generate a unique seed for that user. This seed is sent back to KMLC 1610 via the secure channel 1600, and then shown to user in the QOOBA Window 1210. The user enters the seed into the software or smart phone app token. We note that the actual seed may be generated by a function that transforms the seed the user enters. It will be recognized that for hardware this will only work if the token has a keypad, which most transaction authenticators do indeed have.

As a variant of the above, observe that the transaction authenticator can be built directly into the QOOBA Window 1210 as part of the functionality. While at first blush the rationale for this may not be obvious, compatibility with existing systems such as EMV/CAP provides the rationale for this approach. This on-demand seeding of the transaction authenticators vastly simplifies the costs of provisioning.

Below are described various examples of how key management can be beneficially layered on top of a QOOBA architecture.

The first example relates to digital signing. In applications that require digital signing, a user needs to be provisioned a private key and a digital certificate, i.e. a binding of the user's identity and public key as certified by a certificate authority. The use of such a private key, which is not known to any 3rd party, including the security server, provides for strong non-repudiation that is necessary for some applications. As discussed above, we follow the industry convention of referring to signatures created with public key cryptography as "digital signatures". As will be understood by those skilled in the art and is discussed above, signatures based on underlying symmetric cryptography with shared secrets, like that which the QOOBA system described above already provides, are usually referred to as "electronic signatures".

The second example relates to encrypted document delivery. When an encrypted file is sent to a user, for example a PDF of a brokerage statement, the user needs to be provided with the key with which the file was encrypted.

The third example relates to token authenticators. When users are provisioned a token authenticator, either for a one time password generator or a transaction authenticator, the user's token needs to be provided with a shared secret key.

Those skilled in the art will recognize that in this context, the shared secret key is often characterized as a "seed".

In all these examples key management adds directly to the cost of the system, and indirectly affects the security. Keys need to be generated, distributed and maintained in sync. As keys can get lost, corrupted or stolen, key management is usually a significant source of costs, and a point of vulnerability in the system.

The Recent Extensions of our Initial Work

The recent extensions combine the AA, which we have described above as executable on a SP and which we have sometimes referred to as the QOOBA Phone Window application or the 2CHK application or client, with a dedicated or non-dedicated SP hardware (SPH) device that can attach to a SP in a manner similar to other adjunct pieces of hardware, e.g. a smart card, as described earlier, the combination of which can provide even higher security. The "higher" security is typically to protect against attacks on the SP itself. It should be understood that we use the term "smart phone" broadly to include all wireless network connected devices such as tablet computers, etc.

We start by noting that a dedicated SPH device may indeed be a "dedicated" device, but it could itself be an application running on one of the many devices designed to attach (we use the term "attach" broadly; as this could include attachment via USB cables, near field communications (NFC), Bluetooth, or a headphone jack, etc.) to smart phones for various other purposes. In either case we refer to both such adjunct devices as "SP hardware" or "SPH" below, and have sometimes referred to such adjunct devices as 2CHK hardware. It will be recognized that an adjunct device could, for example, be a secure storage device for the use of the AA, a secure display device, or a secure source of adjunct identification information (e.g. a certificate store, or biometric reader, or fingerprint protected storage, etc.)

When used in this combination, the SP is basically acting as a conduit (or proxy) to ferry messages between the security or authentication server, which we have sometimes referred to as the QOOBA or 2CHK server, and the SPH attached to the SP. The role previously played by the AA executing on the SP, as described above, is now played by the AA executing on the SPH. Activation of the AA on the SPH proceeds as usual, with the preferred procedure being a voice call to the SP to deliver an activation code with key entry of the activation code happening on the SPH. It should be understood that the SPH now has a secure encrypted connection to the security server via the AA, which even the SP "conduit/proxy" cannot read or manipulate. Data passing through the SP, acting as a communications conduit, is encrypted or encoded in such a manner as to only be readable by the AA on the SPH.

Transactions are now viewed securely by the user on the SPH and other interactions proceed as have been described above. The AA on the SPH can also be "seeded" to generate OTP tokens using the innovations described above. This means that OTPs can now be securely generated on the SPH even when it is no longer connected to the SP.

As a final aspect of this unique combination, while this innovation has been described in terms of SPH connected to a SP, the same innovation can be used to connect the security server to an AA running on a SP, via an application, such as a pop-up window or other application running on a personal computer (PC) and serving as a conduit/proxy between the security server and the SP. Thus, in such a case the PC functions in substantially the same manner as the SP described above, i.e. as a conduit/proxy, to pass messages between the security server and the AA executing on the SP. This may useful for instance for a user working on a PC connected to the Internet via a wired LAN network, but in a shielded room which does not permit cell functionality. It should be noted that instead of a PC, any Internet connected device such as a gaming device, a TV, a DVD player, etc., could be the intermediate point serving as the proxy or conduit.

In the following example, the SP has a sample application for the eDuckies store. The SPH has the AA. The AA and eDuckies Application (EDA) are assumed not to multi-task in this example. Each have private storage no one else can see. The AA executing on the SPH also has public storage any other Smart Phone Applications (SPAs) can see and hence access via the proxy/conduit.

With the SPH connected to the SP, the user opens the AA on the SPH and logs in, perhaps once a day. For example, either the user can enter his/her phone number, e.g. the phone number for the SP, or the AA can auto-fill in this information depending on the user's preference. Behind the scenes the AA executing on the SPH talks, via the SP, serving as the proxy or conduit, to the authentication server (also often referred to as a security server or QOOBA server), which then issues a login PIN to the user via a short messaging service (SMS), which is now commonly referred to as a text messaging service.

The user receives the text message with the login PIN on the SP and enters the received Login PIN into the AA on the SPH. On some SPH platforms, the AA can be configured, if so desired, to retrieve the PIN from the incoming SMS stream received by the SP and auto fill the login PIN in on the SPH, making it even easier for users. A private equivalent of a session cookie is stored by the AA on the SPH, and will be used by the AA for subsequent authentications to the authentication server to obtain transaction PINs when available. The AA on the SPH also communicates, via the SP, with other SPAs using the most appropriate method. A unique advantage of this invention is the ability to use public shared storage, such as public pasteboards on the operating system of iPhones. The user is now logged in and a MQOOBA session is active. The user may now start using other SPAs and return to the AA when needed.

In this example, the user now browses the EDA, and eventually wants to place an order. eDuckies would like to get authorization of this order seamlessly. However, it would be insecure to let the user provide payment credentials to the EDA.

Accordingly, the EDA post the transaction, via the SP, to the authentication server, which here serves as the payments system. The EDA also asks the user to authorize the transaction at the AA executing on the SPH. This is similar to a user being redirected to a payments website, such as PayPal™ to authorize a transaction. The authentication server will post the transaction, via the SP, to the AA on the SPH for presentation to the user.

Back at the AA, the user sees a transaction waiting, gets it, and sees that it looks legitimate. Accordingly, the user authorizes the transaction. It should be understood that MQOOBA makes it extremely difficult for an attacker, even one who somehow has placed a malicious eDuckies App on the user's phone, to be able to fake this. The MQOOBA PIN is generated based on a shared secret between authentication server and legitimate merchant site, in this case eDuckies website, and transaction information, etc. if applicable.

After the user authorizes the transaction at the AA on the SPH, back at the EDA the user sees the PIN auto-filled in for them. Behind the scenes, the PIN was generated (using the transaction information provided by the EDA and the secret shared by the authentication server and eDuckies website) by the authentication server, and transferred, via the SP, from the authentication server to the AA on the SPH. The AA then transferred, via the SP, the PIN to the EDA on the user's SP using the shared storage on the SP. It should also be understood that, if desired, the user could be required to manually copy the PIN from the AA on the SPH to the EDA on the SP instead of having the PIN auto filled in. In either case, after the PIN has been filled in on the EDA, when the user clicks "complete authorization", the EDA sends the PIN to the eDuckies website. The eDuckies web service will re-compute the PIN and let the AA on the SPH know, via the SP, if it was valid or not.

As discussed above, the AA executing on the SPH gives a user dynamic login and transaction authorization PINs for particular merchant sites and for particular transactions. The AA can get these PINs from the authentication server website, via the SP, after having logged into it from within the AA on the SPH.

In a nutshell:

The user logs onto the authentication server website.

Thereafter, when the user is at a participating merchant site and needs to login or authorize a transaction, the user is asked to provide a new PIN.

The user then goes to the AA on the SPH and it will show him/her the name of the merchant, and, if applicable, the transaction and provide him/her with the authorizing PIN for the login or transaction.

Figure 19:
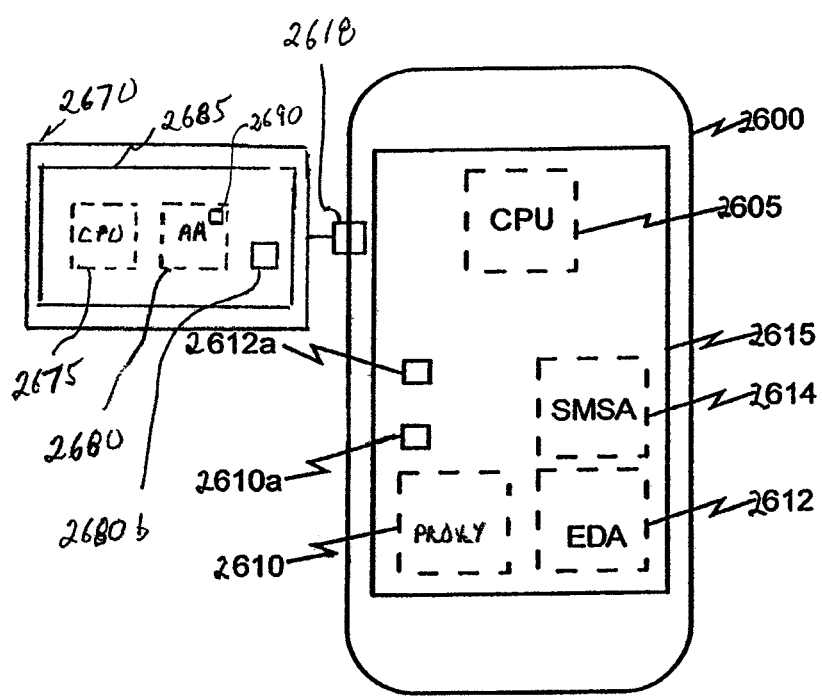
FIG. 19 depicts a smart mobile communication device and adjunct hardware, in accordance with the latest extensions of our initial work.

Referring now to FIG. 19, an SP 2600 is shown. The SP 2600 includes a CPU 2605, a port 2618, such as a USB port, earphone jack or Bluetooth connection, and a display screen 2615. The SP 2600 also has various SPAs executable by the CPU 2605 loaded therein, including the proxy/conduit application 2610, EDA 2612, and SMS application (SMSA) 2614 for text messaging. As shown, EDA 2612 uses public store 2612a.

Removably connected to the SP 2600 via the port 2618, is SPH 2670. The SPH 2670 includes a CPU 2675 and display screen 2685. The SPH 2670 also has at least AA 2680, which is executable by the CPU 2675, loaded therein. It should be understood that various other SPH applications (SPHAs) executable by the CPU 2675 could also be loaded on the SPH, although such SPHAs would typically not include the EDA 2612 or the SMSA 2614. As shown, AA 2680 executing on the SPH uses both public store 2610a and private store 2680b.

Figure 20:
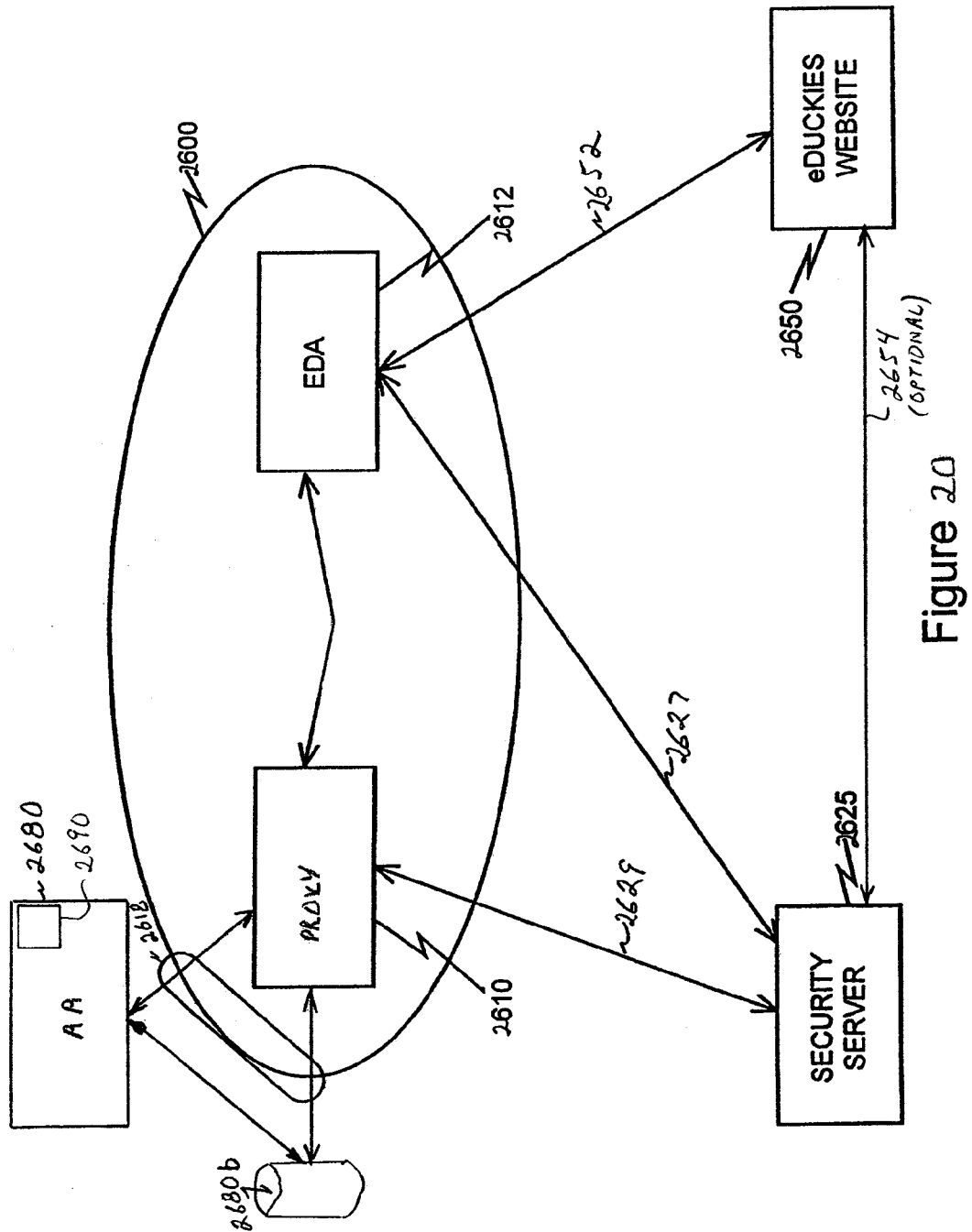
FIG. 20 depicts a simplified network architecture utilizing the FIG. 19 device and hardware, in accordance with the latest extensions of our initial work.

Referring to FIG. 20, the CPU 2675 can execute the AA 2680 to interact with the security server 2625 via communication channel 2629, the proxy 2610 and port 2618. The proxy/conduit 2610 serves as a communication pipeline, between the security server 2625 and the AA 2680 via communication channel 2629 and the port 2618. It also serves as a communication pipeline between the AA 2680 and the AA public storage 2610a on the SP via the port 2618. Furthermore, the CPU 2605 can execute the EDA 2612 to interact with the eDuckies website 2650 via communication channel 2652 and the security server 2625 via communication channel 2627.

Certain operations have been previously described with reference to FIGS. 8-12 for implementations that utilize a SP, without an SPH, and hence rely on the AA executing on the SP for authentication or transaction approval. Corresponding operations will now be described for implementations that utilize SPH and hence rely on the AA executing on the SPH for authentication or transaction approval. However, to avoid unnecessary duplication, these operations using the AA on the SPH will be described with reference to FIGS. 8-12 as appropriate.

When execution of the AA 2680 is started, it causes a display similar to that shown in area A1 of the display 615 as depicted in FIG. 8, in a first area of the display screen 2685. The display in the first area requests a user identifier, such as the phone number, e.g. a cell phone number associated with SP 2600. Preferably the user has previously been allowed to select between a manual option, which if selected would require the identifier to be manually filled in by the user, and an automatic option, which if selected would serve as a directive to the AA 2680 to pre-populate the space provided in the display in the applicable display area with the applicable user identifier, e.g. the cell phone number of the SP 2600).

If the SPH is connected to the SP, when the user clicks an arrow in the display area (see FIG. 8), the AA 2680 causes a post of a first application programming interface (API) message, via the proxy 2610 on the SP, to authentication server 2625. The authentication server 2625 returns, via the proxy 2610, an acknowledgement indication to the AA 2680 and, if the message is acknowledged, the AA 2680 also causes the presentation of that shown in area A2 of the display screen 615 depicted in FIG. 8, in a second area of the display screen 2685. As indicated in area A2 of FIG. 8, if success the authentication server 2625 SMSs, i.e. text messages, a PIN, which is a OTP, to the user at the user's SMS address. By activating execution of the SMSA 2614 by the SP CPU 2605, the user can access his/her SMS account and retrieve the PIN from the SMS message sent by the authentication server. The user then enters the PIN in the space provided in the second display area of display screen 2685, for example by typing the PIN from the SMS message onto the display screen 2685 (see FIG. 8). After entering the PIN the user clicks on an arrow, similar to the arrow shown in area A2 of FIG. 8, and the AA 2680 sends, via the proxy 2610, a second API message to post the PIN.

The return message from the security server 2625, if success, returns to the AA 2680, via the proxy 2610, a session cookie, a random number we call "nonce-login" and a time-to-live (TTL), and the AA 2680 causes a display in a third area of display 2685 of the type shown in area A3 of the display screen 615 in FIG. 9.

It should be noted that, rather than a choice just between manual and automatic fill, the user could additionally or alternatively be allowed to select or be required to enter a user name in the first area and a password in second area of the display 2685. It should also be understood that the choice between manual and automatic described above is only one such choice described herein. Thus, another choice between manual and automatic will be described below in the context of transaction authorization and, more particularly, with respect to whether a different PIN, which is associated with a transaction authorization, is conveyed by the AA executing on the SPH to EDA executing on the SP automatically, or only after a manual input by the user.

The session cookie is stored privately, in private store 2680b. The nonce-login and the TTL are stored publicly on a custom pasteboard, the AA public pasteboard, which is created within public store 2610a (See in the case of the iPhone, Custom Pasteboard development tool at Apple.com). When the user turns his/her "focus" to the AA 2680, the AA 2680 always checks the nonce and TTL, via port 2618. If the TTL has timed out, the AA causes the display on display 2685 of that shown in area A1 of the display screen 615 of FIG. 8, to begin again the log-in to the authentication server 2625.

Figure 10:
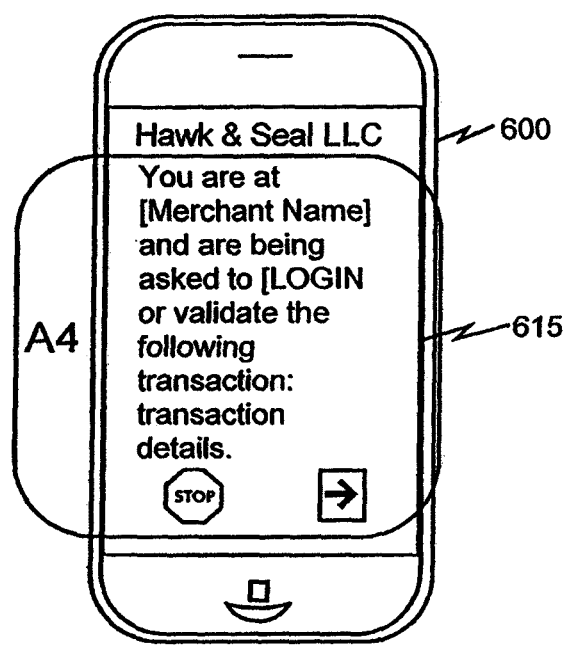
FIG. 10 depicts another display associated with the other login or the transaction authorization, which is presented to the user on the smart mobile communication device of FIG. 6 by an authentication application being executed on that device, in accordance with the still further extensions of our initial work.

When the user is at some other SPA, e.g. the EDA, or website and has been prompted for a PIN either for login or transaction authorization purposes, the user is redirected to the AA 2680 executing on the SPH, as will be further discussed below. For purposes of the description below, we will assume the user is at the EDA. In conjunction with this redirection, the EDA post information to the security server 2625. This information includes whether a login authentication or transaction authorization is requested, the name of the merchant, e.g. eDuckies, and, if transaction authorization is being requested, text of the transaction. If the security server has the ability to PUSH information to the AA, the security server 2625 causes a post of this information to the AA 2680 via the proxy 2610 and port 2618. The AA 2680 causes the display of either the information posted to it by the security server 2625 in a fourth area of the display 2685, which could for example appear like area A4 of FIG. 10, or what is shown in area A1 of FIG. 8 if re-login to the authentication server 2625 is required. For purposes of this discussion, we assume that what is shown in area A4 of FIG. 10 is caused by the AA 2680 to be displayed on the display 2685.

Alternately, if the security server 2625 has no ability to PUSH, we rely on the user to PULL the data. This is the flow that is shown in the figures. When user clicks the arrow in the third area of display 2685, which is similar to area A3 of FIG. 9, the AA 2680 causes a post to the security server 2625, via the port 2618 and proxy 2610. The post includes the session cookie described above.

The security server 2625 returns a success or failure message. The return message always returns a flag indicating login authentication or transaction authorization, the name of the merchant, e.g. eDuckies, a new nonce-login, a new TTL and a PIN, i.e. a OTP. If it is a transaction authorization, it also returns the text of the transaction. If success than the AA 2680 causes the display in the fourth area of the display screen 2685, of that which is shown in area A4 on the display screen of FIG. 10.

If the user clicks the stop sign, the user is directed back to what the display screen 2685 presented in the third area, which is also what is shown displayed on the screen in FIG. 9. Preferably an alarm is sent to the security server 2625, to the EDA 2612 and from there to the merchant website 2650, and/or to some other security related website.

On the other hand, if the user clicks an arrow, similar to that shown in area A4 of FIG. 10, presented in the fourth area of the display screen 2685, the nonce-login and the TTL are written by the AA 2680 executing on the SPH to the AA public pasteboard in public storage 2610a on the SP, via the port 2618 and proxy 2610. The login or transaction PIN, as applicable, is also written to the pasteboard, using the merchant identifier and PIN combination. The merchantid.PIN is written over any previous merchantid.PIN. The user is now again presented with the third area display described above, which is also shown in area A3 of FIG. 9. Alternately if manual PIN transfer is the choice selected, then the user will be shown the PIN within the AA and the onus is on the user to copy it from the AA 2680 on the SPH to the EDA 2612 on the SP.

It is perhaps worthwhile to reemphasize here that, in accordance with our earlier work described in greater detail above, the login or transaction PIN is generated by the authentication server 2625 based on a secret shared by the authentication server and the website, and not shared with or known to the user or associated with any particular user. Furthermore, if transaction authorization is requested, the transaction PIN is generated by the authentication server 2625 also using transaction information.

It should be noted that the EDA 2612 checks if there is an AA public pasteboard, i.e. public storage 2610a on the SP, having a login-nonce with valid TTL for the user. If not, it informs the user that he/she does not appear to have logged into the AA 2680 on the SPH. Here, we have assumed that the user has logged in and that the EDA 2612 has determined that the AA public pasteboard, which serves as public storage 2610a, has a valid nonce.

For purposes of this description, we will assume that transaction authorization is involved. The user is at the EDA 2612 and is presented on the SP display screen 2615 with transaction information of the type shown in area M1 of display screen 615 of FIG. 11. When the user clicks an arrow, such as the shown in area M1 of FIG. 11, he/she is redirected, via proxy 2610 and port 2618, to the AA 2680 executing on the SPH 2670, and the AA 2680 post, via the port 2618 and the proxy 2610, the information relating to the merchant and transaction to the authentication server 2625. The post includes the login-nonce. The security server 2625 returns, via the proxy 2610 and port 2618, a success or failure. If success, then the AA 2680 presents to the user on the display screen 2685 of the SPH, the display shown in area M2 of the display screen 615 depicted in FIG. 12. If the user clicks on an arrow displayed on the display screen 2685, such as one similar to the arrow shown in area M2 of FIG. 12, the transaction authorization process described above is performed and the return message includes a string.

When the focus returns to the EDA 2612, the EDA polls the AA pasteboard, i.e. public storage 2610a, to see if there is a new merchantid.PIN. Once the EDA locates it, it does a post to the eDuckies website 2650 of the string and the transaction authorization PIN. The website 2650 will return to the AA 2680, via the EDA 2612, proxy 2610 and port 2618, a success or a failure message, after it does its own verification of the PIN. It should be noted that if the manual PIN transfer option is chosen, the user must enter the transaction authorization PIN displayed at the AA 2680 into the EDA 2612.

Referring again to FIGS. 19 and 20, as shown therein the AA 2680 can be extended to include the Key Management Logic-Client (KMLC) 2690 on the SPH. The Key Management Logic-Client (KMLC) 2660 corresponds in functionality to the QOOBA Key Management Logic-Client (KMLC) 1610 on the user's desktop 1200, which is shown in FIG. 18 and described above with reference thereto. As has been described above with reference to FIG. 18, Key Management Logic-Client (KMLC) 2690 will interact with the Key Management Logic-Server (KMLS) (not shown in FIGS. 19 and 20) on the security server 2625, the Key Management Logic-API (KMLAPI) (not shown in FIGS. 19 and 20) on a Web Service 2650, and possibility "non-browser" desktop or smart phone software, such as Acrobat Reader or iTunes software (also not shown in FIGS. 19 and 20). KMLC 2690 and the KMLS on the security server 2625 communicate, via the proxy 2610 and port 2618, over the secure channel 2629 between the AA 2680 and the security server 2625. KMLS on the security server 2625 and KMLAPI on the website 2650 communicate over communication channel 2652 and communication channel 2627 via the eDuckies website 2650, or alternatively over the optional back-end communication channel 2654 between the security server 2625 and the Web Service 2650.

Within the above described framework, key generation proceeds as follows. At some point after the AA 2680 is activated, the KMLC 2690 generates a private/public key pair, e.g. Du/Pu and stores the private key Du securely (typically in memory). KMLC 2690 sends the public-key Pu to the security server 2625, where the request is intercepted by the KMLS (not shown) executing on the security server. A digital certificate ("Cert"), which includes the user's public key Pu, is prepared by KMLS, and one of two things happens.

If KMLS on the security server is capable of acting as an intermediate or root certificate authority, it signs the certificate and returns the signed certificate to KMLC 2690, which maintains it locally (preferably in memory). For example, the KMLS on the security server could sign the Cert with the private key Ds of it's private/public key pair Ds/Ps, such that [Cert]Ds is returned to KMLC 2690.

On the other hand, if the KMLS on the security server acts as a "registration authority", it forwards the certificate request to an external certificate authority (not shown in FIGS. 19 and 20), as described with reference to FIG. 18, which creates the certificate and returns it to the KMLS, which in turn forwards the certificate back to KMLC 2690, which maintains it locally (preferably in memory). In such a case, the Cert will be signed by the certificate authority with the private key Dca of it's private/public key pair Dca/Pca such that [Cert]Dca is returned to KMLS operating on the security server. KMLS then forwards the received signed Cert, i.e. [Cert]Dca, to the KMLC 2690.

It is preferable in either instance for the Cert issued to be relatively short lived, i.e. temporary, and coincident with the life of the session between the security server 2625 and AA 2680. By making it simple to do key generation coincident with activation, the need to store digital certificates and private keys locally over an extended period is avoided.

In some situations, as have been discussed in more detail above with reference to FIG. 18, the private key and certificate may be needed by other applications, e.g. browsers or document processors, on the SP (or desktop if the SP serves as the adjunct hardware) to which the SPH is connected via the port 2618. If the underlying operating system supports standard key stores, as MS Windows™ or Apple MacOS™ do, then the KMLC 2690 can be tasked with committing the keys to the key store and deleting them when appropriate.

In addition to the above described generation of keys, i.e. asymmetric keys, suitable for public key cryptography the key management system can also generate and distribute symmetric keys. Central to this is a function Shared_Secret_Generator( ) incorporated within the KMLS executing on the security server 2625, that takes as input such factors as the UserID (perhaps the user's hard line or cell phone number), a long lived secret known only to the security server 2625, and other miscellaneous parameters, and produces as output the shared_secret K. It is important to note that for a given set of inputs the same shared secret will be computed deterministically. Different authenticated entities can request the KMLS on the security server 2625 to provide them with the appropriate symmetric key by providing the KMLS the applicable input parameters.

Note that, depending on the application, Key Management Logic may make use of one or both of asymmetric (i.e. public) key cryptography and symmetric key cryptography capabilities described above.

The key management system described with reference to FIGS. 19 and 20, including its key generation capabilities, can also be applied, in the same manner as has been described above with reference to FIG. 18, to various applications that make use of these capabilities. These applications include, for example, digital signatures, key distribution, and seeding of OTPs and transaction authentication token authenticators. With regard to token authenticators, when users are provisioned a token authenticator, either for a OTP generator or a transaction authenticator, the user's token needs to be provided with a shared secret key. Those skilled in the art will recognize that in this context, the shared secret key is often characterized as a "seed".

With regards to the seeding of OTPs, as pointed out above in the description associated with FIG. 18, OTPs and transaction authentication token authenticators, e.g. hardware, software, smart phone apps, etc., all require a key which is stored in the token and is also stored at the back-end system. Managing these keys (which are commonly referred to as "seeds") introduces costs and complexity. The key management system can be used to greatly simplify this process.

It will be noted that, advantageously, the SPH 2670 can perform certain operations relating to seeding while the SPH is disconnected from the SP 2680. While seeding related operations with the SPH 2670 connected to the SP 2680 have been covered in detail in the description relating to FIG. 18, the following addresses how certain of those operations can be performed with the SPH 2670 disconnected from the SP 2680. For purposes of this discussion it is assumed that a token authenticator (not shown) is implemented as hardware, as software or as a SPH app. The token starts in an inactive state with no seed present (or a seed refresh is required).

As has been described above with reference to FIG. 18, while the SPH 2670 is connected to the SP 2670, seeds generated by the security server 2625 are sent back to KMLC 2690. In the system of FIGS. 19 and 20 the seeds are communicated to the KMLC 260 over the secure channel 2629, via proxy 2610 and port 2618, and can be stored, for example in private storage 2680b. After the SPH 2670 has been disconnected from the SP 2670, the stored seeds can, if desired, be shown to the user by the AA 2680 in a display at the SPH 2670. The user can then enter the seed into software or an app token (not shown) on the SPH 2670, similar to the entry of the seed into software or a SPH app token as described with reference to FIG. 18. Again, we note that the actual seed may be generated by a function that transforms the seed the user enters. It will also be recognized that for hardware this will only work if the token has a keypad, which most transaction authenticators do indeed have.

As a variant of the above, it should also be observed that the transaction authenticator can be built directly into the AA 2680 as part of the functionality. While at first blush the rationale for this may not be obvious, compatibility with existing systems such as EMV/CAP provides the rationale for this approach. This on-demand seeding of the transaction authenticators vastly simplifies the costs of provisioning.

What we claim is:

1. A method of authenticating a user of a network device (ND) having a portable hardware device (PHD) removably and communicatively connected thereto, comprising:
   receiving, by a first application executing on the ND, a request for authentication of the user in connection with either (i) the user logging into a network site or (ii) the user entering into a transaction with the network site;
   receiving, via the ND, by a second application executing on the PHD from a network security server, after receipt of the request for authentication by the first application, a secure message including a personal identification number (PIN) and readable only by the second application, for authenticating the user to the network site;
   transferring the received PIN to the first application; and
   directing, by the first application, transmission from the ND to the network site of the transferred PIN, to authenticate the user or authorize the transaction to the network site;
   wherein the PIN corresponds to a secret shared only by the security server and the network site, and not by the user, and is not associated with any particular user.

2. The method according to claim 1, wherein received PIN is manually transferred by the user to the first application.

3. The method according to claim 2, further comprising:
directing, by the first application, a presentation to the user by the ND of a web page associated with the network site having the request for authentication; and
directing, by the second application, a presentation to the user by the PHD of the received PIN;
wherein the received PIN is manually transferred to the first application by the user inputting the PIN presented by the PHD into the web page presented by the ND.

4. The method according to claim 1, wherein received PIN is automatically transferred to the first application.

5. The method according to claim 4, further comprising:
storing, by the second application, the received PIN in a public data store within ND;
wherein received PIN is transferred to the first application by the first application retrieving the stored PIN from the public data store.

6. The method according to claim 1, further comprising:
receiving, by the second application, a request of the user to login to the security server;
directing, by the second application, transmission of the request and a user identifier from PHD to the security server via the ND;
receiving, by a third application executing on the ND from the security server, a message including another PIN, in response to the transmitted request;
directing, by the third application, display by the ND of the other PIN;
receiving, by the second application, a user input including the displayed other PIN;
directing, by the second application, transmission, from the PHD to the security server via the ND, of the input other PIN;
receiving, by the second application from the security server via the ND, a session cookie and active session information indicating a period of time during which the session between the second application and the security server will remain active, in response to transmission of the other PIN; and
storing, by the second application, (i) the session cookie in a private data store on the PHD accessible only to the second application and (ii) the active session information in a public data store accessible to the first application.

7. The method according to claim 1, further comprising:
receiving via the ND, by the second application from the network security server, a seed; and
storing the received seed so that, after the PHD is disconnected from the ND, the seed is at least one of (i) presentable to the user at the PHD for entry by the user into a seeding interface of a token on the PHD or (ii) enterable into the seeding interface of the token without user intervention.

8. The method according to claim 7, wherein the received seed is an intermediate seed for processing by the token to generate the final seed.

9. The method according to claim 1, wherein if the received request for authentication is in connection with the user entering into a transaction with the network site, further comprising:
receiving via the ND, by the second application from the network security server, information associated with the transaction; and
directing, by the second application, a presentation to the user by the PHD of the transaction information.

10. A portable apparatus removably and communicatively connectable to a network device for communicating authentication credentials for a user in connection with either (i) the user logging into a network site or (ii) the user entering into a transaction with the network site, comprising:
a communications port configured to connect and disconnect the apparatus to and from the ND and to establish a communication link between the apparatus and the ND when connected; and
a processor disposed configured to (1) receive, from a network security server via the port, a secure message, readable only by the processor and not by the ND, including a personal identification number (PIN) for authenticating the user to the network site, and (2) either (i) transfer, via the port, the received PIN to an application associated the network site and executing on the ND or (ii) cause the apparatus to display the received PIN to the user for manual transfer of the PIN to the application associated the network site;
wherein the PIN corresponds to a secret shared only by the security server and the network site, and not by the user, and is not associated with any particular user.

11. The apparatus according to claim 10, wherein the ND is a mobile communications device.

12. The apparatus according to claim 11, wherein the mobile communications device is a smart phone.

13. The apparatus according to claim 10, wherein the port is a USB port, a headphone jack, or a bluetooth connection.

14. The apparatus according to claim 10, further comprising:
a data store;
wherein the processor is further configured to (1) receive a request of the user to login to the security server, (2) direct transmission from the port of the request and a user identifier to the security server via the ND, (3) receive a user input including another PIN, and (4) direct transmission from the port to the security server via the ND, of the input other PIN;
wherein the port is further configured to receive from the security server via the ND, a session cookie and active session information indicating a period of time during which the session with the security server will remain active, in response to transmission of the other PIN; and
wherein the data store stores the session cookie so as to be accessible only to the processor.

15. The apparatus according to claim 10, further comprising:
a data store;
wherein the port is further configured to receive from the security server via the ND, a seed; and
wherein the processor is further configured to (i) direct storage of the received seed in the data store and (ii), after the apparatus is disconnected from the ND, at least one of (i) display the stored seed to the user at the apparatus for entry by the user into a seeding interface of a token or (ii) enter the stored seed into the seeding interface of the token without user intervention.

16. The apparatus according to claim 15, wherein the received seed is an intermediate seed for processing by the token to generate the final seed.

17. The apparatus according to claim 10, wherein if the user is entering into a transaction with the network site, the processor is further configured to:
receive, from a network security server via the port, a secure message, readable only by the processor and not by the ND, including information associated with the transaction; and cause the apparatus to display the received transaction information to the user.

\* \* \* \* \*